United States Patent
Shih et al.

(10) Patent No.: US 10,701,702 B2
(45) Date of Patent: *Jun. 30, 2020

(54) METHOD AND APPARATUS FOR TRANSMISSION USING PRECONFIGURED UPLINK RESOURCES WHILE IN RRC IDLE OR RRC INACTIVE IN A WIRELESS COMMUNICATION SYSTEM

(71) Applicant: ASUSTek Computer Inc., Taipei (TW)

(72) Inventors: Tun-Huai Shih, Taipei (TW); Meng-Hui Ou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,550

(22) Filed: Dec. 16, 2019

(65) Prior Publication Data

US 2020/0137761 A1  Apr. 30, 2020

Related U.S. Application Data

(62) Division of application No. 16/558,710, filed on Sep. 3, 2019.

(Continued)

(51) Int. Cl.
*H04W 72/04* (2009.01)
*H04W 76/25* (2018.01)

(Continued)

(52) U.S. Cl.
CPC ... *H04W 72/0493* (2013.01); *H04W 72/0413* (2013.01); *H04W 76/11* (2018.02); *H04W 76/25* (2018.02); *H04W 76/27* (2018.02)

(58) Field of Classification Search
CPC ......... H04W 72/0493; H04W 72/0413; H04W 76/25; H04W 76/11; H04W 76/27
See application file for complete search history.

(56) References Cited

U.S. PATENT DOCUMENTS

2007/0161377 A1* 7/2007 Kodikara Patabandi ................... H04W 76/11 455/450
2008/0273610 A1* 11/2008 Malladi ................. H04L 1/0032 375/260

(Continued)

FOREIGN PATENT DOCUMENTS

EP    2688357    1/2014

OTHER PUBLICATIONS

Huawei et al: "UL transmission in preconfigured resource", 3GPP Draft; R1-1810089, 3RD Generation Partnership Project (3GPP), Mobile Competence Centre; 650, Route Des Lucioles; F-06921 Sophia-Antipolis Cedex; France vol. RAN WG1, No. Chengdu; Oct. 8, 2018-Oct. 10, 2018, Sep. 29, 2018 (Sep. 29, 2018), XP051517504.

(Continued)

*Primary Examiner* — Dung B Huynh
(74) *Attorney, Agent, or Firm* — Blue Capital Law Firm, P.C.

(57) ABSTRACT

A method and apparatus are disclosed from the perspective of a User Equipment (UE). In one embodiment, the method includes receiving, from a network node, a configuration of Preconfigured Uplink Resources (PUR), when the UE is in RRC_CONNECTED state, wherein the PUR is used for a transmission when the UE is in RRC_IDLE state. The method also includes determining to generate a first Radio Resource Control (RRC) message or a second RRC message for the transmission based on whether the transmission is to be transmitted using the PUR or not, wherein the first RRC message includes a UE identity and the second RRC message does not include the UE identity. The method further includes performing the transmission including the first (Continued)

RRC message or the second RRC message when the UE is in RRC_IDLE state.

18 Claims, 11 Drawing Sheets

Related U.S. Application Data

(60) Provisional application No. 62/753,318, filed on Oct. 31, 2018.

(51) Int. Cl.
*H04W 76/11* (2018.01)
*H04W 76/27* (2018.01)

(56) References Cited

U.S. PATENT DOCUMENTS

| | | | |
|---|---|---|---|
| 2009/0052388 A1* | 2/2009 | Kim | H04W 74/002 370/329 |
| 2009/0111476 A1* | 4/2009 | Hamalainen | H04W 72/02 455/450 |
| 2009/0316593 A1* | 12/2009 | Wang | H04W 74/0833 370/252 |
| 2010/0067470 A1* | 3/2010 | Damnjanovic | H04L 5/0053 370/329 |
| 2010/0080155 A1* | 4/2010 | Suzuki | H04W 56/00 370/310 |
| 2010/0278064 A1* | 11/2010 | Jeong | H04L 43/0829 370/252 |
| 2010/0278131 A1* | 11/2010 | Jeong | H04W 74/0833 370/329 |
| 2010/0296467 A1* | 11/2010 | Pelletier | H04W 74/002 370/329 |
| 2010/0325226 A1* | 12/2010 | McBeath | H04W 56/00 709/206 |
| 2012/0008600 A1* | 1/2012 | Marinier | H04W 74/0833 370/336 |
| 2012/0063302 A1* | 3/2012 | Damnjanovic | H04W 56/0045 370/228 |
| 2012/0182986 A1* | 7/2012 | Sebire | H04W 56/00 370/343 |
| 2012/0202558 A1* | 8/2012 | Hedberg | H04L 5/0058 455/550.1 |
| 2012/0207040 A1* | 8/2012 | Comsa | H04W 72/1215 370/252 |
| 2012/0250498 A1* | 10/2012 | Johansson | H04L 41/0604 370/221 |
| 2012/0281566 A1* | 11/2012 | Pelletier | H04W 72/1221 370/252 |
| 2013/0039287 A1* | 2/2013 | Rayavarapu | H04W 76/28 370/329 |
| 2013/0058315 A1* | 3/2013 | Feuersanger | H04W 52/327 370/336 |
| 2013/0182626 A1* | 7/2013 | Kuo | H04W 52/0216 370/311 |
| 2013/0223362 A1* | 8/2013 | Alfano | H04W 72/04 370/329 |
| 2014/0079032 A1* | 3/2014 | Bergstrom | H04W 56/0005 370/336 |
| 2015/0146635 A1* | 5/2015 | Filipovich | H04W 56/0045 370/329 |
| 2015/0249972 A1* | 9/2015 | You | H04L 5/001 370/254 |
| 2016/0007377 A1* | 1/2016 | Frenne | H04W 74/006 370/329 |
| 2016/0128094 A1* | 5/2016 | Lee | H04W 72/1289 370/329 |
| 2016/0157256 A1* | 6/2016 | Tseng | H04W 72/1284 370/329 |
| 2016/0219495 A1* | 7/2016 | Martin | H04W 48/16 |
| 2016/0270019 A1* | 9/2016 | Dinan | H04J 11/00 |
| 2016/0270071 A1* | 9/2016 | Dinan | H04L 5/001 |
| 2016/0278160 A1* | 9/2016 | Schliwa-Bertling | H04W 76/19 |
| 2016/0309379 A1* | 10/2016 | Pelletier | H04W 76/27 |
| 2016/0345261 A1* | 11/2016 | Walldeen | H04W 76/27 |
| 2016/0345314 A1* | 11/2016 | Webb | H04W 4/70 |
| 2017/0064534 A1* | 3/2017 | Loehr | H04W 72/1268 |
| 2017/0202047 A1* | 7/2017 | Tiwari | H04W 76/27 |
| 2017/0289968 A1* | 10/2017 | Marco | H04W 72/14 |
| 2017/0311278 A1* | 10/2017 | Adjakple | H04W 60/00 |
| 2017/0311290 A1* | 10/2017 | Adjakple | H04W 4/06 |
| 2017/0318606 A1* | 11/2017 | Lee | H04L 67/12 |
| 2017/0325281 A1* | 11/2017 | Hong | H04W 72/048 |
| 2017/0331639 A1* | 11/2017 | Quan | H04L 12/433 |
| 2017/0339612 A1* | 11/2017 | Quan | H04W 36/04 |
| 2017/0367058 A1* | 12/2017 | Pelletier | H04W 56/0045 |
| 2018/0007590 A1* | 1/2018 | Karout | H04W 74/0833 |
| 2018/0020382 A1* | 1/2018 | Kim | H04W 72/042 |
| 2018/0020431 A1* | 1/2018 | Cho | H04W 72/042 |
| 2018/0035420 A1* | 2/2018 | Centonza | H04W 72/048 |
| 2018/0035466 A1* | 2/2018 | Rune | H04W 74/08 |
| 2018/0035484 A1* | 2/2018 | Kim | H04W 76/19 |
| 2018/0042057 A1* | 2/2018 | Johansson | H04W 76/10 |
| 2018/0063722 A1* | 3/2018 | Lee | H04W 48/12 |
| 2018/0092125 A1* | 3/2018 | Sun | H04W 74/02 |
| 2018/0098358 A1* | 4/2018 | Rico Alvarino | H04L 5/0092 |
| 2018/0132282 A1* | 5/2018 | Ly | H04W 48/12 |
| 2018/0139778 A1* | 5/2018 | Chou | H04W 76/27 |
| 2018/0167823 A1* | 6/2018 | Uchino | H04L 5/0094 |
| 2018/0192371 A1* | 7/2018 | Jung | H04W 72/046 |
| 2018/0192436 A1* | 7/2018 | Yi | H04W 72/14 |
| 2018/0192439 A1* | 7/2018 | Tang | H04W 74/08 |
| 2018/0198665 A1* | 7/2018 | Guo | H04W 56/0005 |
| 2018/0206272 A1* | 7/2018 | Maaref | H04W 72/042 |
| 2018/0213452 A1* | 7/2018 | Kim | H04W 36/0033 |
| 2018/0220448 A1* | 8/2018 | Akkarakaran | H04L 5/0023 |
| 2018/0220468 A1* | 8/2018 | Lin | H04W 74/0841 |
| 2018/0220486 A1* | 8/2018 | Tseng | H04W 76/27 |
| 2018/0220487 A1* | 8/2018 | Wu | H04W 76/27 |
| 2018/0227962 A1* | 8/2018 | Mallick | H04W 72/0413 |
| 2018/0234890 A1* | 8/2018 | Shih | H04W 36/0005 |
| 2018/0234941 A1* | 8/2018 | Kim | H04W 68/005 |
| 2018/0255484 A1* | 9/2018 | Wu | H04B 7/0697 |
| 2018/0255586 A1* | 9/2018 | Einhaus | H04W 72/0413 |
| 2018/0270716 A1* | 9/2018 | Takahashi | H04W 76/28 |
| 2018/0270892 A1* | 9/2018 | Choi | H04W 76/27 |
| 2018/0279375 A1* | 9/2018 | Jeon | H04W 72/14 |
| 2018/0279377 A1* | 9/2018 | Lin | H04W 72/0406 |
| 2018/0279407 A1* | 9/2018 | Xu | H04W 76/27 |
| 2018/0287689 A1* | 10/2018 | Lee | H04W 76/27 |
| 2018/0302914 A1* | 10/2018 | da Silva | H04W 72/1268 |
| 2018/0302918 A1* | 10/2018 | Shaheen | H04W 72/1284 |
| 2018/0302944 A1* | 10/2018 | Chang | H04W 76/20 |
| 2018/0317202 A1* | 11/2018 | Chang | H04L 9/0847 |
| 2018/0324869 A1* | 11/2018 | Phuyal | H04W 74/0833 |
| 2018/0359669 A1* | 12/2018 | Fujishiro | H04W 36/08 |
| 2019/0021128 A1* | 1/2019 | Sivavakeesar | H04W 76/19 |
| 2019/0021134 A1* | 1/2019 | Zhang | H04W 36/0033 |
| 2019/0037420 A1* | 1/2019 | Fujishiro | H04W 76/27 |
| 2019/0037447 A1* | 1/2019 | Lee | H04W 74/004 |
| 2019/0037635 A1* | 1/2019 | Guo | H04W 76/19 |
| 2019/0045482 A1* | 2/2019 | Lee | H04W 76/11 |
| 2019/0052435 A1* | 2/2019 | Martin | H04W 76/27 |
| 2019/0082490 A1* | 3/2019 | Zhang | H04W 76/27 |
| 2019/0104553 A1* | 4/2019 | Johansson | H04W 72/0453 |
| 2019/0124715 A1* | 4/2019 | Chen | H04W 76/11 |
| 2019/0132900 A1* | 5/2019 | Hong | H04W 28/0215 |
| 2019/0141515 A1* | 5/2019 | Kim | H04W 76/28 |
| 2019/0150221 A1* | 5/2019 | Tseng | H04W 76/27 370/331 |
| 2019/0159110 A1* | 5/2019 | Takahashi | H04W 48/14 |
| 2019/0166553 A1* | 5/2019 | Ryoo | H04W 74/0833 |
| 2019/0174571 A1* | 6/2019 | Deenoo | H04W 76/28 |
| 2019/0182799 A1* | 6/2019 | Lee | H04W 76/27 |
| 2019/0208411 A1* | 7/2019 | Shrestha | H04W 12/001 |
| 2019/0215858 A1* | 7/2019 | Ishii | H04W 76/25 |
| 2019/0230712 A1* | 7/2019 | Ou | H04W 48/14 |
| 2019/0254107 A1* | 8/2019 | Stattin | H04W 76/34 |
| 2019/0268869 A1* | 8/2019 | Akkarakaran | H04L 5/0094 |

(56) References Cited

U.S. PATENT DOCUMENTS

| | | | | |
|---|---|---|---|---|
| 2019/0274182 A1* | 9/2019 | Jia | | H04W 72/0446 |
| 2019/0306739 A1* | 10/2019 | Kim | | H04W 76/15 |
| 2019/0306853 A1* | 10/2019 | Ishii | | H04W 60/00 |
| 2019/0313333 A1* | 10/2019 | Kim | | H04W 36/0033 |
| 2019/0320488 A1* | 10/2019 | Mildh | | H04W 76/11 |
| 2019/0335397 A1* | 10/2019 | Ganesan | | H04W 52/0235 |
| 2019/0335515 A1* | 10/2019 | Chen | | H04L 69/22 |
| 2019/0350002 A1* | 11/2019 | Chen | | H04W 72/14 |
| 2019/0350019 A1* | 11/2019 | Wu | | H04W 74/0833 |
| 2019/0350031 A1* | 11/2019 | Bedekar | | H04W 52/146 |
| 2019/0350032 A1* | 11/2019 | Chen | | H04W 76/11 |
| 2019/0350037 A1* | 11/2019 | Lee | | H04W 76/18 |
| 2019/0357296 A1* | 11/2019 | Ohlsson | | H04W 76/11 |
| 2019/0387570 A1* | 12/2019 | Byun | | H04W 8/08 |
| 2020/0015074 A1* | 1/2020 | Kim | | H04W 12/002 |
| 2020/0022044 A1* | 1/2020 | Kim | | H04W 36/08 |
| 2020/0029326 A1* | 1/2020 | Wang | | H04W 72/048 |
| 2020/0037309 A1* | 1/2020 | Sengupta | | H04L 5/005 |
| 2020/0045674 A1* | 2/2020 | Tseng | | H04W 72/04 |

OTHER PUBLICATIONS

Sony: "Considerations for Preconfigured UL Resources in A-MTC", 3GPP Draft; R1-1810649-REL-16 A-MTC-PUR V02, 3rd Generation Partnership Project (3GPP), Mobile Competence Centre; 650, Route Des Lucioles; F-06921 Sophia-Antipolis Cedex; France vol. RAN WG1, No. Chengdu, China; Oct. 8, 2018-Oct. 12, 2018 Sep. 28, 2018 (Sep. 28, 2018), XP051518055.

Sierra Wireless: "Pre-configured UL Resources Design Considerations", 3GPP Draft; R2-1815078, 3rd Generation Partnership Project (3GPP), Mobile Competence Centre; 650, Route Des Lucioles; F-06921 Sophia-Antipolis Cedex; France vol. RAN WG2, No. Chengdu, China; Oct. 8, 2018-Oct. 12, 2018 Sep. 28, 2018 (Sep. 28, 2018), XP051524445.

Huawei et al: "Feature lead summary of Support for transmission in preconfigured UL resourrps" 3GPP Draft; R1-1811697 Feature Lead Summary on Support for Transmission in Preconfigured UL Resources, 3rd Generation Partnership Project (3GPP), Mobile Competence Centre; 650, Route Des Lucioles; F vol. RAN WG1, No. Chengdu, China; Oct. 8, 2018-Oct. 12, 2018 Oct. 9, 2018 (Oct. 9, 2018), XP051519086.

Sierra Wireless: "NB-IOT Pre-configured UL Resources Design Considerations", 3GPP Draft; R1-1810490 NB PUR, 3rd Generation Partnership Project (3GPP), Mobile Competence Centre; 650, Route Des Lucioles; F-06921 Sophia-Antipolis Cedex; France vol. RAN WG1, No. Chengdu, China; Oct. 8, 2018-Oct. 12, 2018 Sep. 28, 2018 (Sep. 28, 2018), XP051517898.

ZTE: "Consideration on early data transmission in FeNB-IoT", 3GPP Draft; R2-1707805 Consideration on Early Data Transmission in FENB-IOT, 3rd Generation Partnership Project (3GPP), Mobile Competence Centre; 650, Route Des Lucioles; F-06921 Sophia-Antipolis Ce, vol. RAN WG2, No. Berlin, Germany; Aug. 21, 2017-Aug. 25, 2017 Aug. 20, 2017 (Aug. 20, 2017), XP051317765.

Sierra Wireless: "LTE-M Pre-configured UL Resources Design Considerations", 3GPP Draft; R1-1810489 LTE-M PUR, 3rd Generation Partnership Project (3GPP), Mobile Competence Centre; 650, Route Des Lucioles; F-06921 Sophia-Antipolis Cedex; France vol. RAN WG1, No. Chengdu, China; Oct. 8, 2018-Oct. 12, 2018 Sep. 28, 2018 (Sep. 28, 2018), XP051517897.

Nokia et al: "Transmission in preconfigured UL resources", 3GPP Draft R1-1811058_ Transmissi0ninprec0nfiguredulre Sources, 3rd Generation Partnership Project (3GPP), Mobile Competence Centre; 650, Route Des Lucioles; F-06921 Sophia-Antipolis Cedex; France vol. RAN WG1, No. Chengdu, China; Oct. 8, 2018-Oct. 12, 2018 Sep. 28, 2018 (Sep. 28, 2018), XP051518460.

European Search Report in corresponding EP Application No. 19218424.0, dated Mar. 19, 2020.

* cited by examiner

METHOD AND APPARATUS FOR TRANSMISSION USING PRECONFIGURED UPLINK RESOURCES WHILE IN RRC IDLE OR RRC INACTIVE IN A WIRELESS COMMUNICATION SYSTEM

CROSS-REFERENCE TO RELATED APPLICATIONS

This application is a Divisional of U.S. patent application Ser. No. 16/558,710, filed on Sep. 3, 2019, which claims the benefit of U.S. Provisional Patent Application Ser. No. 62/753,318 filed on Oct. 31, 2018, the entire disclosures of which are incorporated herein in their entirety by reference.

FIELD

This disclosure generally relates to wireless communication networks, and more particularly, to a method and apparatus for transmission using preconfigured uplink resources in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE). In one embodiment, the method includes receiving, from a network node, a configuration of Preconfigured Uplink Resources (PUR), when the UE is in RRC_CONNECTED state, wherein the PUR is used for a transmission when the UE is in RRC_IDLE state. The method also includes determining to generate a first Radio Resource Control (RRC) message or a second RRC message for the transmission based on whether the transmission is to be transmitted using the PUR or not, wherein the first RRC message includes a UE identity and the second RRC message does not include the UE identity. The method further includes performing the transmission including the first RRC message or the second RRC message when the UE is in RRC_IDLE state.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.300 V15.3.0, "Evolved Universal Terrestrial Radio Access (E-UTRA) and Evolved Universal Terrestrial Radio Access Network (E-UTRAN), Overall description, Stage 2"; TS 36.321 V15.3.0, "Evolved Universal Terrestrial Radio Access (E-UTRA); Medium Access Control (MAC) protocol specification"; RAN1 #94 Chairman's Note; RAN1 #94bis Chairman's Note; TS 36.331 V15.3.0, "Evolved Universal Terrestrial Radio Access (E-UTRA); Radio Resource Control (RRC); Protocol specification". The standards and documents listed above are hereby expressly incorporated by reference in their entirety.

Figure 1:
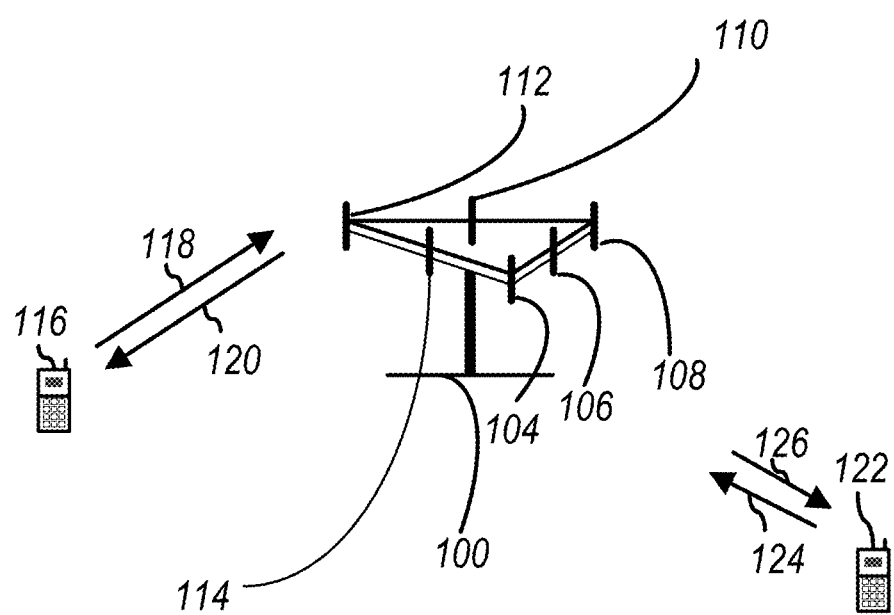
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
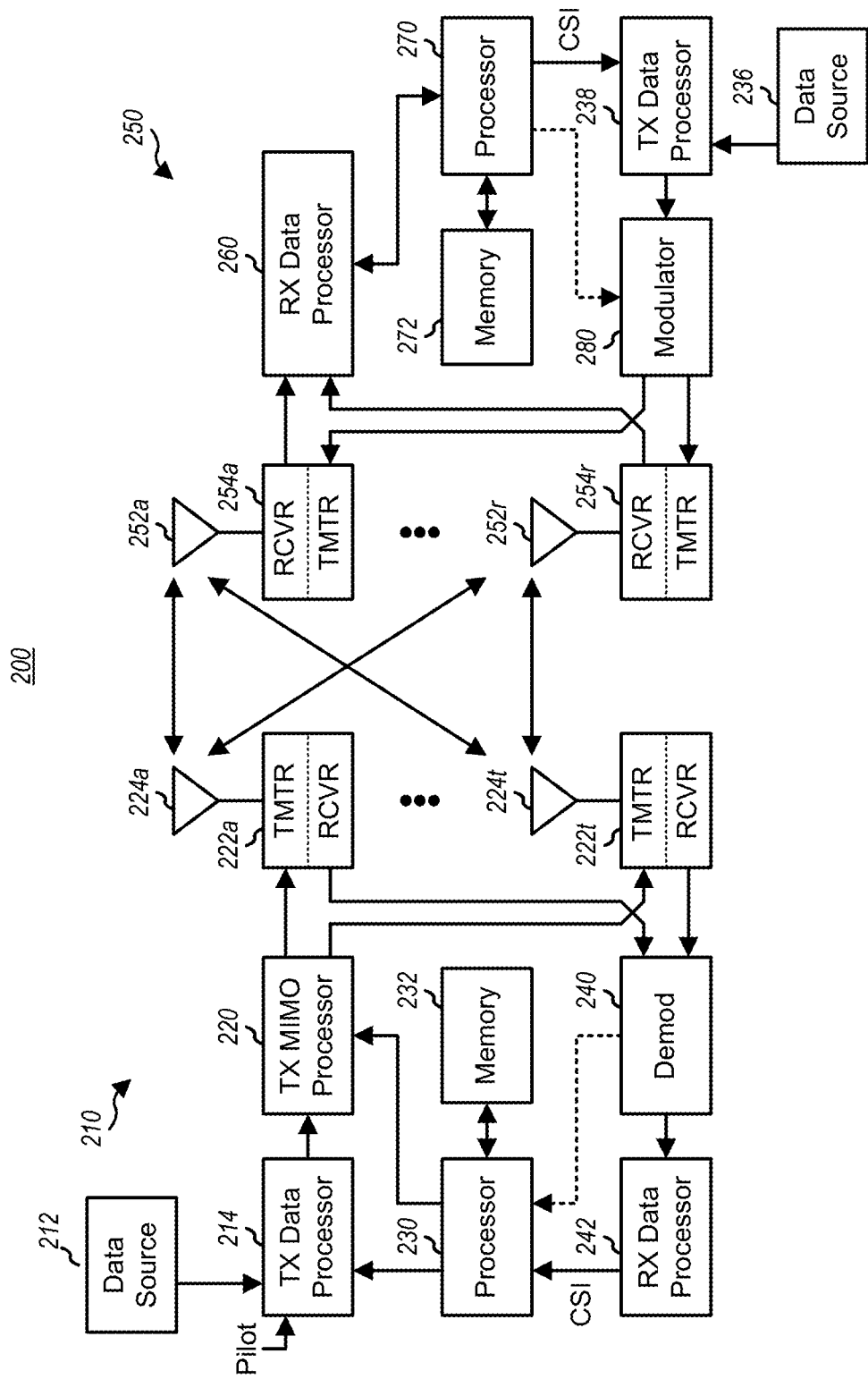
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix Index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
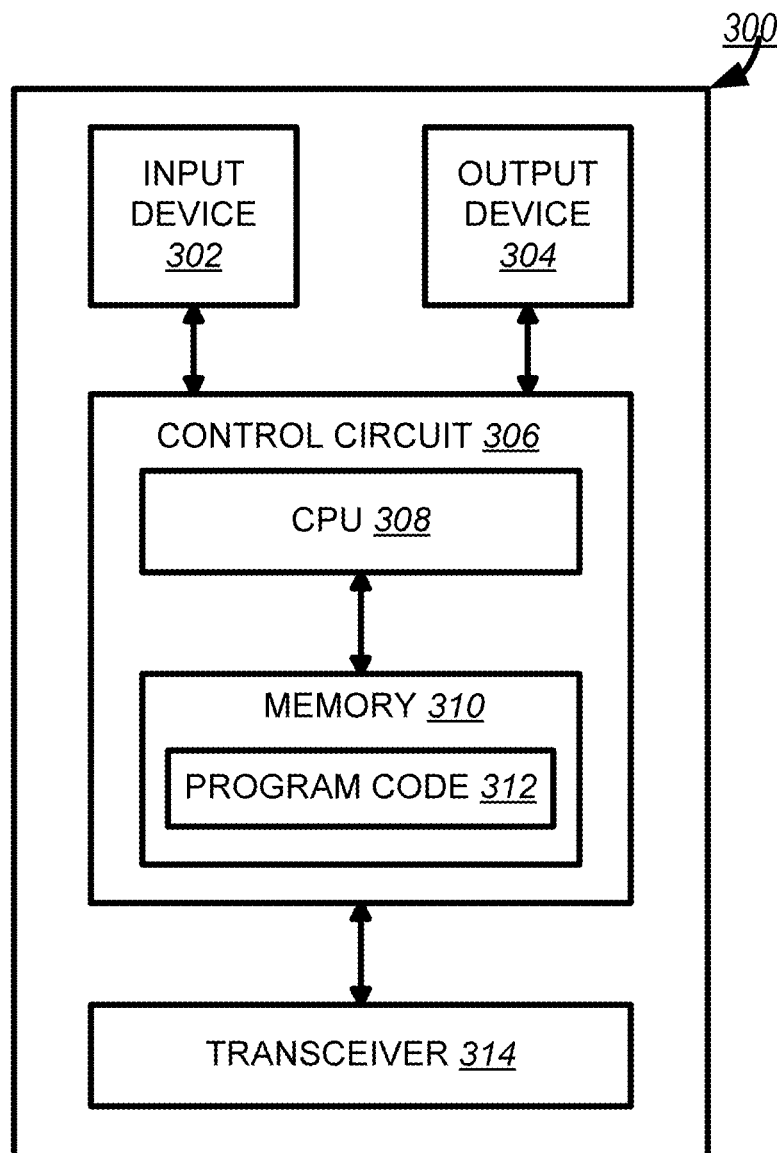
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
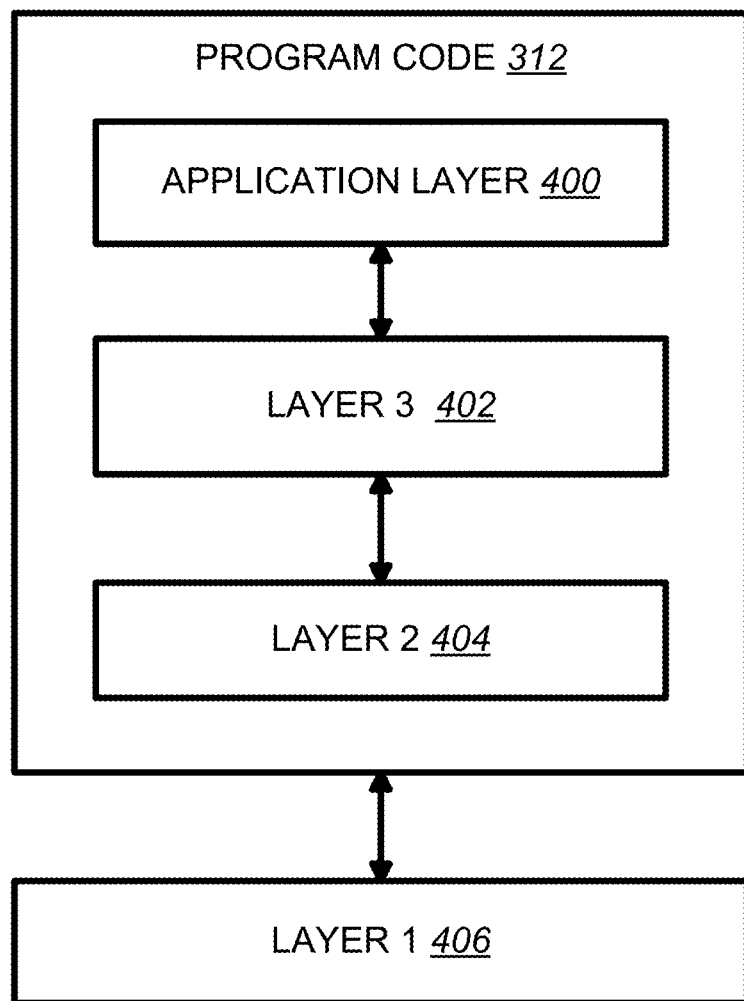
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Early Data Transmission (EDT) is introduced in LTE Release-15. 3GPP TS 36.300 provides the following description related to EDT:

7.3b EDT 7.3b.1 General

EDT allows one uplink data transmission optionally followed by one downlink data transmission during the random access procedure.

EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.

EDT is only applicable to BL UEs, UEs in Enhanced Coverage and NB-IoT UEs.

7.3b.2 EDT for Control Plane CIoT EPS Optimizations

EDT for Control Plane CIoT EPS optimizations, as defined in TS 24.301 [20], is characterized as below:

Uplink user data are transmitted in a NAS message concatenated in UL RRCEarlyDataRequest message on CCCH;

Downlink user data are optionally transmitted in a NAS message concatenated in DL RRCEarlyDataComplete message on CCCH;

There is no transition to RRC_CONNECTED.

Figure 7:
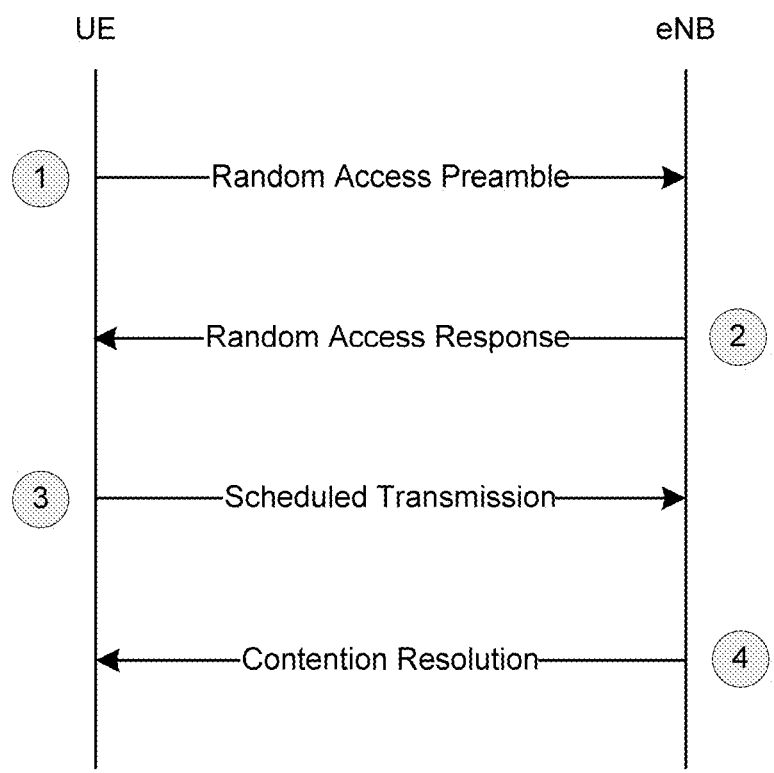
FIG. 7 is a reproduction of FIG. 10.1.5.1-1 of 3GPP TS 36.300 V15.3.0.

The EDT procedure for Control Plane CIoT EPS optimizations is illustrated in FIG. 7.3b-1.

Figure 5:
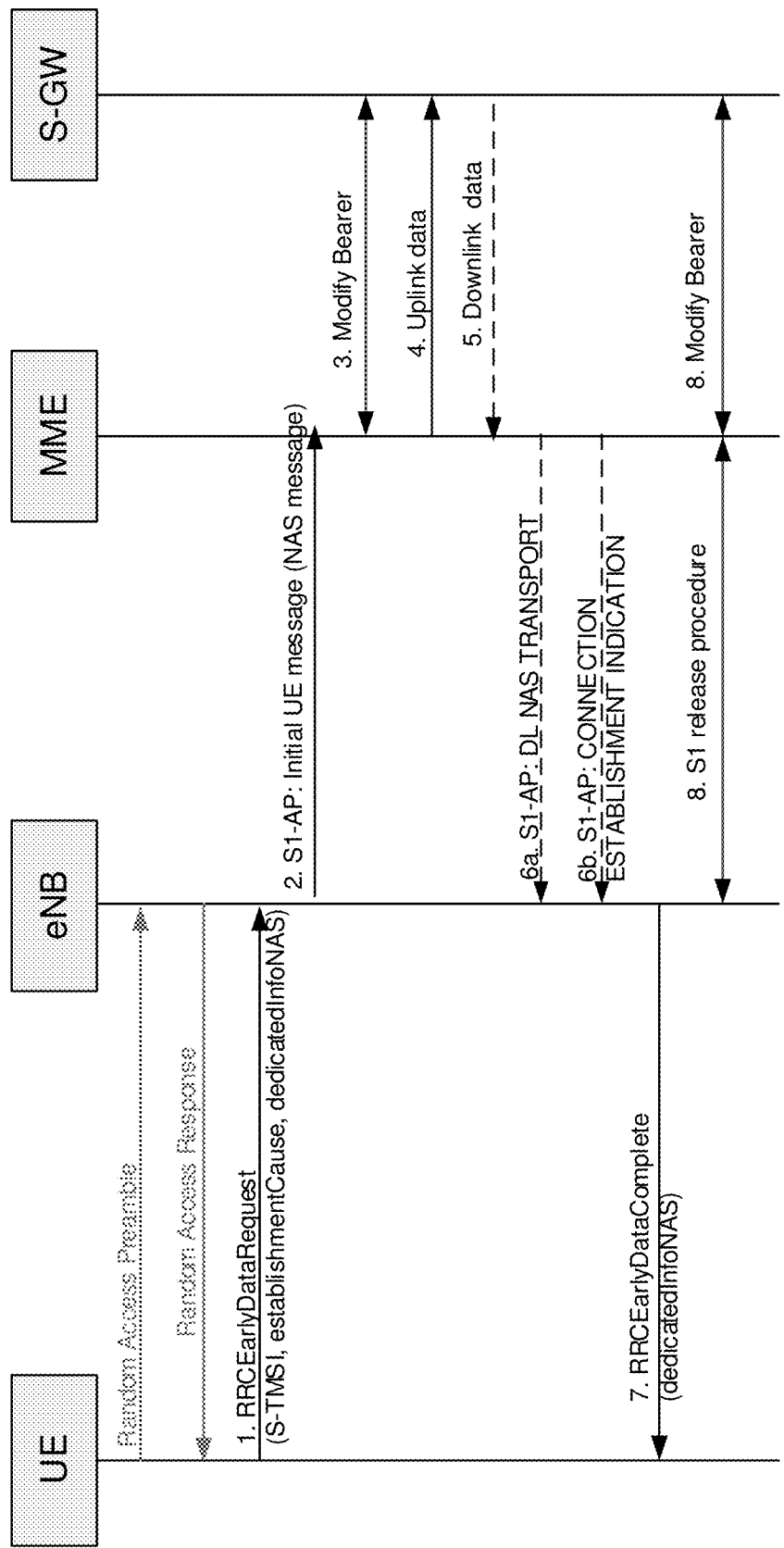
FIG. 5 is a reproduction of FIG. 7.3b-1 of 3GPP TS 36.300 V15.3.0.

[FIG. 7.3b-1 of 3GPP TS 36.300 V15.3.0, Entitled "EDT for Control Plane CIoT EPS Optimizations", is Reproduced as FIG. 5]

0. Upon connection establishment request for Mobile Originated data from the upper layers, the UE initiates the early data transmission procedure and selects a random access preamble configured for EDT.
1. UE sends RRCEarlyDataRequest message concatenating the user data on CCCH.
2. The eNB initiates the S1-AP Initial UE message procedure to forward the NAS message and establish the S1 connection. The eNB may indicate in this procedure that this connection is triggered for EDT.
3. The MME requests the S-GW to re-activate the EPS bearers for the UE.
4. The MME sends the uplink data to the S-GW.
5. If downlink data are available, the S-GW sends the downlink data to the MME.
6. If downlink data are received from the S-GW, the MME forwards the data to the eNB via DL NAS Transport procedure and may also indicate whether further data are expected. Otherwise, the MME may trigger Connection Establishment Indication procedure and also indicate whether further data are expected.
7. If no further data are expected, the eNB can send the RRCEarlyDataComplete message on CCCH to keep the UE in RRC_IDLE. If downlink data were received in step 6, they are concatenated in RRCEarlyDataComplete message.
8. The S1 connection is released and the EPS bearers are deactivated.

NOTE: If the MME or the eNB decides to move the UE in RRC_CONNECTED mode, RRCConnectionSetup message is sent in step 7 to fall back to the legacy RRC Connection establishment procedure; the eNB will discard the zero-length NAS PDU received in msg5.

7.3b.3 EDT for User Plane CIoT EPS Optimizations

EDT for User Plane CIoT EPS optimizations, as defined in TS 24.301 [20], is characterized as below:

The UE has been provided with a NextHopChainingCount in the RRCConnectionRelease message with suspend indication;

Uplink user data are transmitted on DTCH multiplexed with UL RRCConnectionResumeRequest message on CCCH;

Downlink user data are optionally transmitted on DTCH multiplexed with DL RRCConnectionRelease message on DCCH;

The short resume MAC-I is reused as the authentication token for RRCConnectionResumeRequest message and is calculated using the integrity key from the previous connection;

The user data in uplink and downlink are ciphered. The keys are derived using the NextHopChainingCount provided in the RRCConnectionRelease message of the previous RRC connection;

The RRCConnectionRelease message is integrity protected and ciphered using the newly derived keys;

There is no transition to RRC_CONNECTED.

The EDT procedure for User Plane CIoT EPS optimizations is illustrated in FIG. 7.3b-2.

Figure 6:
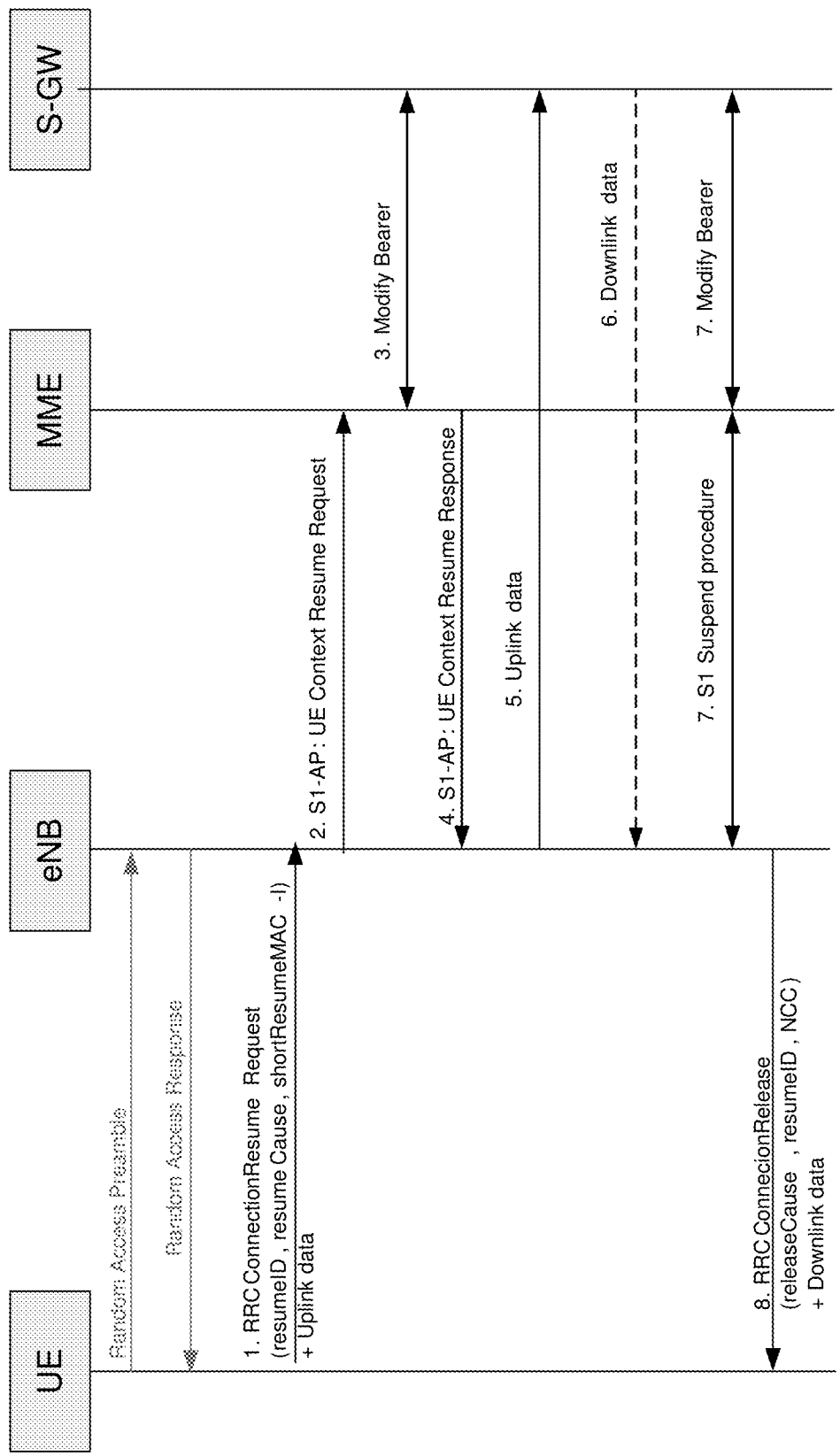
FIG. 6 is a reproduction of FIG. 7.3b-2 of 3GPP TS 36.300 V15.3.0.

[FIG. 7.3b-2 of 3GPP TS 36.300 V15.3.0, Entitled "EDT for User Plane CIoT EPS Optimizations", is Reproduced as FIG. 6]

0. Upon connection resumption request for Mobile Originated data from the upper layers, the UE initiates the early data transmission procedure and selects a random access preamble configured for EDT.
1. The UE sends an RRCConnectionResumeRequest to the eNB, including its Resume ID, the establishment cause, and an authentication token. The UE resumes all SRBs and DRBs, derives new security keys using the NextHopChainingCount provided in the RRCConnectionRelease message of the previous connection and re-establishes the AS security. The user data are ciphered and transmitted on DTCH multiplexed with the RRCConnectionResumeRequest message on CCCH.
2. The eNB initiates the S1-AP Context Resume procedure to resume the S1 connection and re-activate the S1-U bearers.
3. The MME requests the S-GW to re-activate the S1-U bearers for the UE.
4. The MME confirms the UE context resumption to the eNB.
5. The uplink data are delivered to the S-GW.
6. If downlink data are available, the S-GW sends the downlink data to the eNB.
7. If no further data are expected from the S-GW, the eNB can initiate the suspension of the S1 connection and the deactivation of the S1-U bearers.
8. The eNB sends the RRCConnectionRelease message to keep the UE in RRC_IDLE. The message includes the releaseCause set to rrc-Suspend, the resumeID, the NextHopChainingCount and drb-ContinueROHC which are stored by the UE. If downlink data were received in step 6, they are sent ciphered on DTCH multiplexed with the RRCConnectionRelease message on DCCH.

NOTE: If the MME or eNB decides the UE to move in RRC_CONNECTED mode, RRCConnectionResume message is sent in step 7 to fall back to the RRC Connection resume procedure. In that case, the RRCConnectionResume message is integrity protected and ciphered with the keys derived in step 1 and the UE ignores the NextHopChainingCount included in the RRCConnectionResume message. Downlink data can be transmitted on DTCH multiplexed with the RRC-ConnectionResume message.

10.1 Intra E-UTRAN
10.1.5 Random Access Procedure
The random access procedure is characterized by:
  Common procedure for FDD and TDD;
  One procedure irrespective of cell size and the number of serving cells when CA is configured;
The random access procedure is performed for the following events related to the PCell:
  Initial access from RRC_IDLE;
  RRC Connection Re-establishment procedure, as defined in TS 24.301 [20];
  Handover, except for NB-IoT or when RACH-less HO is configured;
  DL data arrival during RRC_CONNECTED requiring random access procedure:
    E.g. when UL synchronisation status is "non-synchronised".
  UL data arrival during RRC_CONNECTED requiring random access procedure:
    E.g. when UL synchronisation status is "non-synchronised" or there are no PUCCH resources for SR available.
  For positioning purpose during RRC_CONNECTED requiring random access procedure:
    E.g. when timing advance is needed for UE positioning.
[ . . . ]
Furthermore, the random access procedure takes two distinct forms:
  Contention based (applicable to all six events, but the sixth event for positioning is applicable for NB-IoT only);
  Non-contention based (applicable to only handover, DL data arrival, positioning and obtaining timing advance alignment for a sTAG).
Normal DL/UL transmission can take place after the random access procedure.
[ . . . ]
10.1.5.1 Contention Based Random Access Procedure
The contention based random access procedure is outlined on FIG. 10.1.5.1-1 below:
[FIG. 10.1.5.1-1 of 3GPP TS 36.300 V15.3.0, Entitled "Contention Based Random Access Procedure", is Reproduced as FIG. 7]
The four steps of the contention based random access procedures are:
  1) Random Access Preamble on RACH in uplink:
    There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.
  2) Random Access Response generated by MAC on DL-SCH:
    Semi-synchronous (within a flexible window of which the size is one or more TTI) with message 1;
    No HARQ;
    Addressed to RA-RNTI on PDCCH;
    Conveys at least RA-preamble identifier, Timing Alignment information for the pTAG, initial UL grant and assignment of Temporary C-RNTI (which may or may not be made permanent upon Contention Resolution);
    Intended for a variable number of UEs in one DL-SCH message.
  3) First scheduled UL transmission on UL-SCH:
    Uses HARQ;
    Size of the transport blocks depends on the UL grant conveyed in step 2.
    For initial access:
      Conveys the RRC Connection Request generated by the RRC layer and transmitted via CCCH;
      Conveys at least NAS UE identifier but no NAS message;
      RLC TM: no segmentation.
    For RRC Connection Re-establishment procedure:
      Conveys the RRC Connection Re-establishment Request generated by the RRC layer and transmitted via CCCH;
      RLC TM: no segmentation;
      Does not contain any NAS message.
    After handover, in the target cell:
      Conveys the ciphered and integrity protected RRC Handover Confirm generated by the RRC layer and transmitted via DCCH;
      Conveys the C-RNTI of the UE (which was allocated via the Handover Command);
      Includes an uplink Buffer Status Report when possible.
    For other events:
      Conveys at least the C-RNTI of the UE;
    In the procedure to resume the RRC connection:
      Conveys the RRC Connection Resume Request generated by the RRC layer and transmitted via CCCH;
      Conveys a Resume ID to resume the RRC connection;
    For NB-IoT:
      In the procedure to setup the RRC connection:
        An indication of the amount of data for subsequent transmission(s) on SRB or DRB can be indicated.
      For EDT for Control Plane CIoT EPS Optimizations:
        Conveys the RRC Early Data Request generated by the RRC layer and transmitted via CCCH;
        Conveys NAS UE identifier and user data concatenated in a NAS message.
      For EDT for User Plane CIoT EPS Optimizations:
        Conveys the RRC Resume Request generated by the RRC layer and transmitted via CCCH;
        Conveys a Resume ID to resume the RRC connection.
        Conveys ciphered user data transmitted via DTCH.
  4) Contention Resolution on DL:
    Early contention resolution shall be used i.e. eNB does not wait for NAS reply before resolving contention;
    For NB-IoT, for initial access, RRC connection resume procedure and RRC Connection Re-establishment procedure, eNB may transmit MAC PDU containing the UE contention resolution identity MAC control element without RRC response message;
  NOTE: In Release 13, NB-IoT UEs do not support the MAC PDU containing the UE contention resolution identity MAC control element without RRC response message for initial access, RRC connection resume procedure and RRC Connection Re-establishment procedure.

Not synchronised with message 3;

HARQ is supported;

Addressed to:
The Temporary C-RNTI on PDCCH for initial access and after radio link failure;
The C-RNTI on PDCCH for UE in RRC_CONNECTED.

HARQ feedback is transmitted only by the UE which detects its own UE identity, as provided in message 3, echoed in the Contention Resolution message;

For initial access, RRC Connection Re-establishment procedure and EDT for Control Plane CIoT EPS Optimizations, no segmentation is used (RLC-TM).

The Temporary C-RNTI is promoted to C-RNTI for a UE which detects RA success and does not already have a C-RNTI; it is dropped by others. A UE which detects RA success and already has a C-RNTI, resumes using its C-RNTI.

3GPP TS 36.321 also provides the following description related to EDT:

5.1 Random Access Procedure 5.1.1 Random Access Procedure Initialization

The Random Access procedure described in this subclause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order [5] masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex, except for NB-IoT where the subcarrier Index is indicated; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE, the Random Access procedure is performed on the anchor carrier or one of the non-anchor carriers for which PRACH resource has been configured in system information.

[ . . . ]

The following information for related Serving Cell is assumed to be available before the procedure can be initiated for NB-IoT UEs, BL UEs or UEs in enhanced coverage [8]:

if the UE is a BL UE or a UE in enhanced coverage:
the available set of PRACH resources associated with each enhanced coverage level supported in the Serving Cell for the transmission of the Random Access Preamble, prach-ConfigIndex.
for EDT, the available set of PRACH resources associated with EDT for each enhanced coverage level supported in the Serving Cell for the transmission of the Random Access Preamble, prach-ConfigIndex.
the groups of Random Access Preambles and the set of available Random Access Preambles in each group (SpCell only):
If sizeOfRA-PreamblesGroupA is not equal to numberOfRA-Preambles:
Random Access Preambles group A and B exist and are calculated as above;

else:
the preambles that are contained in Random Access Preamble groups for each enhanced coverage level, if it exists, are the preambles firstPreamble to lastPreamble.

NOTE: When a PRACH resource is shared for multiple enhanced coverage levels, and enhanced coverage levels are differentiated by different preamble indices, Group A and Group B is not used for this PRACH resource.

if the UE is an NB-IoT UE:
the available set of PRACH resources supported in the Serving Cell on the anchor carrier, nprach-ParametersList, and on the non-anchor carriers, in ul-ConfigList.
for EDT, the available set of PRACH resources associated with EDT on anchor carrier, nprach-ParametersList-EDT, and on the non-anchor carriers, in ul-ConfigList.
for random access resource selection and preamble transmission:
a PRACH resource is mapped into an enhanced coverage level.
each PRACH resource contains a set of nprach-NumSubcarriers subcarriers which can be partitioned into one or two groups for single/multi-tone Msg3 transmission by nprach-SubcarrierMSG3-RangeStart and nproch-NumCBRA-StartSubcarriers as specified in TS 36.211 [7, 10.1.6.1]. Each group is referred to as a Random Access Preamble group below in the procedure text.
a subcarrier is identified by the subcarrier Index in the range: [nprach-SubcarrierOffset, nprach-SubcarrierOffset+nprach-NumSubcarriers−1]
each subcarrier of a Random Access Preamble group corresponds to a Random Access Preamble.
when the subcarrier Index is explicitly sent from the eNB as part of a PDCCH order ra-PreambleIndex shall be set to the signalled subcarrier Index.
the mapping of the PRACH resources into enhanced coverage levels is determined according to the following:
the number of enhanced coverage levels is equal to one plus the number of RSRP thresholds present in rsrp-ThresholdsPrachInfoList.
each enhanced coverage level has one anchor carrier PRACH resource present in nprach-ParametersList and zero or one PRACH resource for each non-anchor carrier signalled in ul-ConfigList.
for EDT, each enhanced coverage level has zero or one anchor carrier PRACH resource present in nprach-ParametersList-EDT and zero or one PRACH resource for each non-anchor carrier signalled in ul-ConfigList.
enhanced coverage levels are numbered from 0 and the mapping of PRACH resources to enhanced coverage levels are done in increasing numRepetitionsPerPreambleAttempt order.
when multiple carriers provide PRACH resources for the same enhanced coverage level, the UE will randomly select one of them using the following selection probabilities:
the selection probability of the anchor carrier PRACH resource for the given enhanced coverage level, nprach-ProbabilityAnchor, is given by the corresponding entry in nprach-ProbabilityAnchorList the selection probability is equal for all non-anchor carrier PRACH resources and the probability of selecting one PRACH resource on a given non-anchor carrier is (1−nprach-ProbabilityAnchor)/(number of non-anchor NPRACH resources)

the criteria to select PRACH resources based on RSRP measurement per enhanced coverage level supported in the Serving Cell rsrp-ThresholdsPrachInfoList.

the maximum number of preamble transmission attempts per enhanced coverage level supported in the Serving Cell maxNumPreambleAttemptCE.

the number of repetitions required for preamble transmission per attempt for each enhanced coverage level supported in the Serving Cell numRepetitionPerPreambleAttempt.

the configured UE transmitted power of the Serving Cell performing the Random Access Procedure, $P_{CMAX, c}$ [10].

the RA response window size ra-ResponseWindowSize and the Contention Resolution Timer mac-ContentionResolutionTimer (SpCell only) per enhanced coverage level supported in the Serving Cell.

for EDT, the Contention Resolution Timer mac-ContentionResolutionTimer configured for EDT (SpCell only) per enhanced coverage level supported in the Serving Cell.

the power-ramping factor powerRampingStep and optionally powerRampingStepCE1.

the maximum number of preamble transmission preambleTransMax-CE.

the initial preamble power preambleInitialReceivedTargetPower and optionally preambleInitialReceivedTargetPowerCE1.

the preamble format based offset DELTA_PREAMBLE (see subclause 7.6). For NB-IoT the DELTA_PREAMBLE is set to 0.

for NB-IoT, the use of contention free random access ra-CFRA-Config.

The Random Access procedure shall be performed as follows:

Flush the Msg3 buffer;
set the PREAMBLE_TRANSMISSION_COUNTER to 1;
if the UE is an NB-IoT UE, a BL UE or a UE in enhanced coverage:
  set the PREAMBLE_TRANSMISSION_COUNTER_CE to 1;
if the starting enhanced coverage level, or for NB-IoT the starting number of NPRACH repetitions, has been indicated in the PDCCH order which initiated the Random Access procedure, or if the starting enhanced coverage level has been provided by upper layers:
  the MAC entity considers itself to be in that enhanced coverage level regardless of the measured RSRP;
else:
  if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:
    the MAC entity considers to be in enhanced coverage level 3;
  else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:
    the MAC entity considers to be in enhanced coverage level 2;
  else if the measured RSRP is less than the RSRP threshold of enhanced coverage level 1 as configured by upper layers in rsrp-ThresholdsPrachInfoList then:
    the MAC entity considers to be in enhanced coverage level 1;
  else:
    the MAC entity considers to be in enhanced coverage level 0;
set the backoff parameter value to 0 ms;
for the RN, suspend any RN subframe configuration;
proceed to the selection of the Random Access Resource (see subclause 5.1.2).

NOTE: There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

NOTE: An NB-IoT UE measures RSRP on the anchor carrier.

[ . . . ]

5.1.4 Random Access Response Reception

[ . . . ]

If no Random Access Response or, for NB-IoT UEs, BL UEs or UEs in enhanced coverage for mode B operation, no PDCCH scheduling Random Access Response is received within the RA Response window, or if none of all received Random Access Responses contains a Random Access Preamble identifier corresponding to the transmitted Random Access Preamble, the Random Access Response reception is considered not successful and the MAC entity shall:

if the notification of power ramping suspension has not been received from lower layers:
  increment PREAMBLE_TRANSMISSION_COUNTER by 1;
if the UE is an NB-IoT UE, a BL UE or a UE in enhanced coverage:
  if PREAMBLE_TRANSMISSION_COUNTER=preambleTransMax-CE+1:
    if the Random Access Preamble is transmitted on the SpCell:
      indicate a Random Access problem to upper layers;
    if NB-IoT:
      consider the Random Access procedure unsuccessfully completed;
else:
  if PREAMBLE_TRANSMISSION_COUNTER=preambleTransMax+1:
    if the Random Access Preamble is transmitted on the SpCell:

indicate a Random Access problem to upper layers;
if the Random Access Preamble is transmitted on an SCell:
consider the Random Access procedure unsuccessfully completed.
if in this Random Access procedure, the Random Access Preamble was selected by MAC:
based on the backoff parameter, select a random backoff time according to a uniform distribution between 0 and the Backoff Parameter Value;
delay the subsequent Random Access transmission by the backoff time;
else if the SCell where the Random Access Preamble was transmitted is configured with ul-Configuration-r14:
delay the subsequent Random Access transmission until the Random Access Procedure is initiated by a PDCCH order with the same ra-PreambleIndex and ra-PRACH-MaskIndex;
if the UE is an NB-IoT UE, a BL UE or a UE in enhanced coverage:
increment PREAMBLE_TRANSMISSION_COUNTER_CE by 1;
if PREAMBLE_TRANSMISSION_COUNTER_CE=maxNumPreambleAttemptCE for the corresponding enhanced coverage level+1:
reset PREAMBLE_TRANSMISSION_COUNTER_CE;
consider to be in the next enhanced coverage level, if it is supported by the Serving Cell and the UE, otherwise stay in the current enhanced coverage level;
if the UE is an NB-IoT UE:
if the Random Access Procedure was initiated by a PDCCH order:
select the PRACH resource in the list of UL carriers providing a PRACH resource for the selected enhanced coverage level for which the carrier Index is equal to ((Carrier Indication from the PDCCH order) modulo (Number of PRACH resources in the selected enhanced coverage));
consider the selected PRACH resource as explicitly signalled;
proceed to the selection of a Random Access Resource (see subclause 5.1.2).
[ . . . ]

5.4.5 Buffer Status Reporting

The Buffer Status reporting procedure is used to provide the serving eNB with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signalling logicalChannelGroup which allocates the logical channel to an LCG [8].

For the Buffer Status reporting procedure, the MAC entity shall consider all radio bearers which are not suspended and may consider radio bearers which are suspended.

For NB-IoT the Long BSR is not supported and all logical channels belong to one LCG.

A Buffer Status Report (BSR) shall be triggered if any of the following events occur:

UL data, for a logical channel which belongs to a LCG, becomes available for transmission in the RLC entity or in the PDCP entity (the definition of what data shall be considered as available for transmission is specified in [3] and [4] or [17] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the MAC entity has data available for transmission for any of the logical channels which belong to a LCG, in which case the BSR is referred below to as "Regular BSR";

periodicBSR-Timer expires, in which case the BSR is referred below to as "Periodic BSR".

[ . . . ]

For NB-IoT or BL UEs:
if rai-Activation is configured, and a buffer size of zero bytes has been triggered for the BSR, and the UE may have more data to send or receive in the near future:
cancel any pending BSR.

[ . . . ]

For EDT, the MAC entity shall not generate a BSR MAC control element if new transmission is for Msg3.

[ . . . ]

5.4.5a Data Volume and Power Headroom Reporting

The Data Volume and Power Headroom reporting procedure is only applicable for NB-IoT UEs and is used to provide the serving eNB with information about the amount of data available for transmission in the UL buffers associated with the MAC entity, and to provide the serving eNB with information about the difference between the nominal UE maximum transmission power and the estimated transmission power for UL-SCH transmission for the Serving Cell. The reporting is done using the DPR MAC control element, which is sent in Msg3 together with a CCCH SDU. For EDT, the Data Volume in DPR MAC control element is set to zero.

If enhanced-PHR is configured, a UE supporting extended power headroom reporting shall report extended power headroom level using the DPR MAC control element.

Transmission in preconfigured uplink resources (PUR) is discussed in 3GPP RAN1. Some agreements made by RAN1 as described in 3GPP #94 Chairman's Note as follows:

Agreement

Idle mode based pre-configured UL resources is supported for UEs in possession of a valid TA FFS: Validation mechanism for TA FFS: How the pre-configured UL resources is acquired Agreement For transmission in preconfigured UL resources, the UE may use the latest TA of which its validity can be confirmed Agreement Study both shared and dedicated resource for preconfigured UL resources. If both shared and dedicated resources are supported, strive for commonality in design of both resource types.

Agreement

HARQ procedures for transmission in preconfigured UL resources should be studied and the following aspects should be considered:

Whether to support HARQ;
   If supported, details of HARQ design including the number of HARQ processes;
   Whether ACK/NACK is necessary
Fallback mechanisms should be considered, e.g. fallback to legacy RACH/EDT procedures.
   Other agreements made by RAN1 as described in 3GPP #94bis Chairman's Note as follows:
Agreement
In idle mode, the UE will at least consider one or more of the following attributes when validating TA (combination of multiple attributes is allowed):
   Serving cell changes (serving cell refers the cell that the UE is camping on)
   Time Alignment Timer for idle mode
   Serving cell RSRP changes (serving cell refers the cell that the UE is camping on)
   FFS Other attributes:
      Neighbour cell RSRP change
      TDOA of >=2 eNBs
      TA History
      Subscription based UE differentiation
      Others not precluded (for example, attributes that need to be considered for high mobility UEs)
Note that UE power consumption should be taken into account for the FFS attributes
Agreement
Dedicated preconfigured UL resource is defined as an PUSCH resource used by a single UE
   PUSCH resource is time-frequency resource
   Dedicated PUR is contention-free
Contention-free shared preconfigured UL resource (CFS PUR) is defined as an PUSCH resource simultaneously used by more than one UE
   PUSCH resource is at least time-frequency resource
   CFS PUR is contention-free
Contention-based shared preconfigured UL resource (CBS PUR) is defined as an PUSCH resource simultaneously used by more than one UE
   PUSCH resource is at least time-frequency resource
   CBS PUR is contention-based (CBS PUR may require contention resolution)
Agreement
In IDLE mode, HARQ is supported for transmission in dedicated PUR
   A single HARQ process is supported,
      FFS whether more than one HARQ processes are supported
   FFS: The design of the corresponding MPDCCH search space
Agreement
In idle mode, dedicated PUR is supported.
   Support for CFS PUR is FFS.
   Support for CBS PUR is FFS.
Agreement
For UL transmission in preconfigured resource, fallback mechanism to RACH/EDT procedures is supported.
Agreement
For transmission in preconfigured UL resources, an RRC idle UE may use the latest TA that passed the validation criteria
Agreement
Pre-configured UL resources for transmission of data are indicated by RRC signaling. At least UE-specific RRC signaling is supported.
Agreement
The resource configuration includes at least the following
   Time domain resources including periodicity(s)
   Frequency domain resources
   TBS(s)/MCS(s)
Agreement
Dedicated preconfigured UL resource is defined as an NPUSCH resource used by a single UE
   NPUSCH resource is time-frequency resource
   Dedicated PUR is contention-free
Contention-free shared preconfigured UL resource (CFS PUR) is defined as an NPUSCH resource simultaneously used by more than one UE
   NPUSCH resource is at least time-frequency resource
   CFS PUR is contention-free
Contention-based shared preconfigured UL resource (CBS PUR) is defined as an NPUSCH resource simultaneously used by more than one UE
   NPUSCH resource is at least time-frequency resource
   CBS PUR is contention-based (CBS PUR may require contention resolution)
   In the following paragraphs, "MTC UEs" could include "Bandwidth reduced and Low complexity UEs (BL UEs)" and/or "UEs in enhanced coverage (UEs in EC, UEs in CE)".
   In LTE Release 15, in order to improve transmission efficiency and reduce power consumption for MTC UEs and NB-IoT UEs, Early Data Transmission (EDT) is introduced. EDT could be applicable for MTC UEs and NB-IoT UEs. EDT could be triggered in RRC_IDLE state. After EDT is triggered, the UL user data (e.g. Mobile Originated data) is included in Msg3 during a Random Access procedure, and NW may include DL user data in Msg4 during the Random Access procedure. One benefit of EDT is that UL user data could be transmitted without the need of entering RRC_CONNECTED state. It is also possible that EDT fallbacks to legacy RRC connection establishment/resume procedure, and the UL user data may be transmitted after UE enters RRC_CONNECTED state.
   In general, there are two types of EDT:
   CP-EDT (EDT for Control Plane CIoT EPS optimizations)
   UL user data is transmitted in a NAS message concatenated in UL RRCEarlyDataRequest message on CCCH. RRCEarlyDataRequest message is included in Msg3 during a Random Access procedure.
   DL user data may be optionally transmitted in a NAS message concatenated in DL RRCEarlyDataComplete message on CCCH. RRCEarlyDataComplete message is included in Msg4 during the Random Access procedure.
   If the MME or the eNB decides to move the UE in RRC_CONNECTED mode, RRCConnectionSetup message is sent in Msg4 to fall back to the legacy RRC Connection establishment procedure.
   UP-EDT (EDT for User Plane CIoT EPS optimizations)
   UL user data is transmitted on DTCH multiplexed with UL RRCConnectionResumeRequest message on CCCH. In this case, both DTCH SDU and CCCH SDU are included in Msg3 during a Random Access procedure.
   DL user data may be optionally transmitted on DTCH multiplexed with DL RRCConnectionRelease message on DCCH. In this case, both DTCH SDU and DCCH SDU are included in Msg4 during the Random Access procedure.

If the MME or eNB decides to move the UE in RRC_CONNECTED mode, RRCConnectionResume message (and optionally DL user data) is sent in Msg4 to fall back to the RRC Connection resume procedure.

In LTE Release 16, in order to further improve transmission efficiency and reduce power consumption for MTC UEs and NB-IoT UEs, transmission(s) in preconfigured UL resources (PUR) will be introduced and is currently under discussion. According to RAN1 agreements, a UE could use dedicated (i.e. not shared among multiple UEs) PUR in RRC_IDLE state if some criteria are met. The criteria at least include valid Time Alignment (TA). The validation mechanism for TA is still under discussion, and may include, for example, a TA Timer for idle mode. The UE may consider its TA valid if the TA Timer is running. HARQ is supported for transmission(s) using dedicated PUR to improve reliability, but the details are still under discussion. In addition, fallback mechanism to RACH/EDT procedures is also supported, but the details are still under discussion.

It is still unclear how transmission(s) using PUR is modeled in UE side. The configuration of PUR may be provided in a dedicated signaling to the UE when the UE is in RRC connected mode. The configured PUR may be valid when the UE is in RRC idle mode. The configured PUR may not require lower layer activation. The UE may not use the configured PUR if no data is available for transmission.

For dedicated PUR, because NW can identify which UE is performing a transmission using PUR, contention resolution is not needed. It may comprise two steps. The first step is the transmission using PUR, and the second step is reception of NW response. The NW response could be an acknowledgement of whether the transmission has been received successfully, e.g. HARQ feedback or an indication in a paging message. The NW response could be dynamic UL grant for retransmission. The NW response could be DL user data and/or RRC message, e.g. RRCEarlyDataComplete. The DL user data and/or RRC message could be scheduled by a dynamic DL assignment. The dynamic DL assignment could be addressed to a specific RNTI (e.g. C-RNTI (of the UE when the UE was last time in RRC_CONNECTED), Temporary C-RNTI, or a new RNTI). The specific RNTI could be provided in the dedicated PUR configuration. The specific RNTI could be provided when UE is in RRC_CONNECTED state. The DL user data and/or RRC message could be scheduled by a paging message dedicated for the UE. The DL user data and/or RRC message could be carried in a paging message (dedicated) for the UE. If retransmission is required, the UE may perform retransmission in the next PUR occasion or based on dynamic UL grant received in the second step (in case dynamic UL grant in IDLE mode is supported).

It is beneficial that UE could enter RRC_CONNECTED without performing a Random Access (RA) procedure. In addition, it is also beneficial if the contention-based RA procedure for EDT could be omitted. PUR may be prioritized over EDT and/or RACH. For example, RRCEarlyDataRequest, RRCConnectionRequest, and/or RRCConnectionResumeRequest message could be transmitted using (dedicated) PUR. To support, the possible procedure could include one or multiple steps (which may or may not be in order) as follows: (some details are omitted for simplicity)
1. (In RRC_IDLE state,) the UE RRC generates the RRC message (e.g. RRCEarlyDataRequest, RRCConnectionRequest, or RRCConnectionResumeRequest) and submits the RRC message to lower layer, e.g. through CCCH.
2. Because (UL CCCH) data becomes available for transmission, the UE MAC could trigger a Regular Buffer Status Report (BSR).
3. A Scheduling Request (SR) may or may not be triggered due to the Regular BSR.
4. In response to the Regular BSR and/or the SR, the UE could check if PUR is available. If PUR is available, there is no need to trigger SR and/or no need to initiate RA. If PUR is modeled as an event, the UE should "trigger" PUR in this step. The UE could generate a MAC PDU including the RRC message and transmit the MAC PDU using PUR. Retransmission of the MAC PDU may be possible. If a BSR MAC CE is included in the MAC PDU, the triggered BSR and/or the triggered SR could be canceled when the UE transmits the MAC PDU using PUR. If a BSR MAC CE is not included in the MAC PDU, the triggered BSR and/or the triggered SR could be canceled when the UE transmits the MAC PDU using PUR or when the MAC PDU is transmitted successfully, e.g. based on NW response. The triggered BSR and/or the triggered SR could be canceled by resetting the corresponding MAC entity.
5. The UE could receive NW response and may enter RRC_CONNECTED state in response to the NW response, e.g. according to an indication in the NW response. The NW response could be RRCEarlyDataComplete, RRCConnectionSetup, or RRCConnectionResume message. If PUR is modeled as an event, the UE should "cancel" PUR in this step. If the UE enters RRC_CONNECTED state and the DL assignment scheduling the NW response is addressed to a specific RNTI (e.g. C-RNTI, Temporary C-RNTI, or a new RNTI), the UE could set the C-RNTI to the value of the specific RNTI. The specific RNTI could be provided as part of the PUR configuration.

Alternatively, the NW response could indicate whether to set the C-RNTI to the value of the specific RNTI or not. For example, the NW response may include a second RNTI. If the UE enters RRC_CONNECTED state in response to the NW response and the NW response includes the second RNTI, the UE sets the C-RNTI to the value of the second RNTI. If the UE enters UE enters RRC_CONNECTED state in response to the NW response and the NW response does not include the second RNTI, the UE sets the C-RNTI to the value of the specific RNTI.

In order to receive the NW response, one way is to configure a timer/window and the UE monitors PDCCH for scheduling the NW response continuously during the timer/window period. The timer/window could reuse the RA response window. The timer/window could be started once or right after transmission of the MAC PDU is started (e.g. first repetition of the transmission is transmitted). The timer/window could be started when or right after transmission of the MAC PDU is completed (e.g. last repetition of the transmission is transmitted). Another way is that the UE (only) monitors PDCCH for scheduling the NW response in predefined/configured occasions, e.g. paging occasions in IDLE and/or (group) wake up signal occasions in IDLE.

Figure 8:
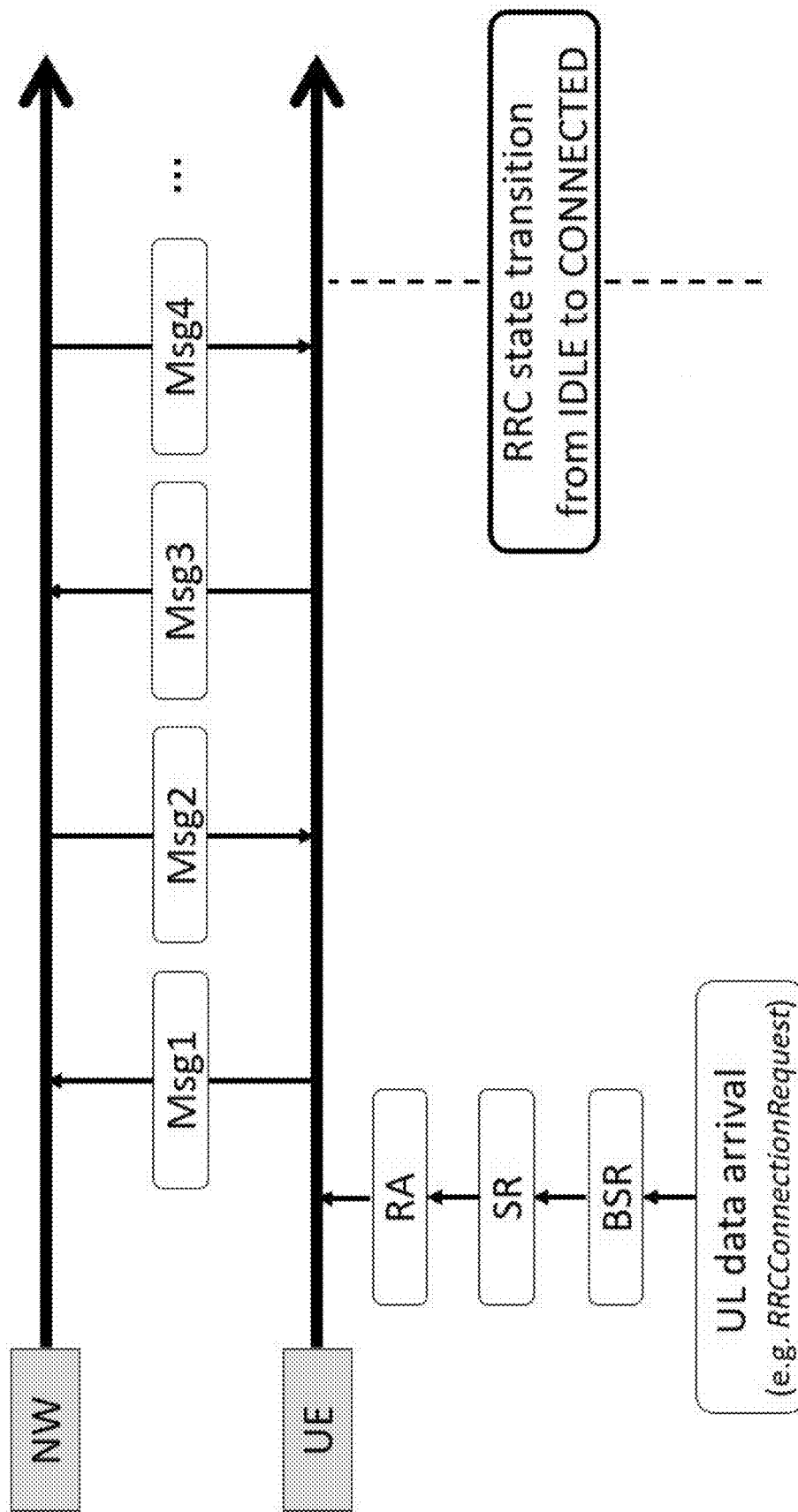
FIG. 8 is a diagram according to one exemplary embodiment.
Figure 9:
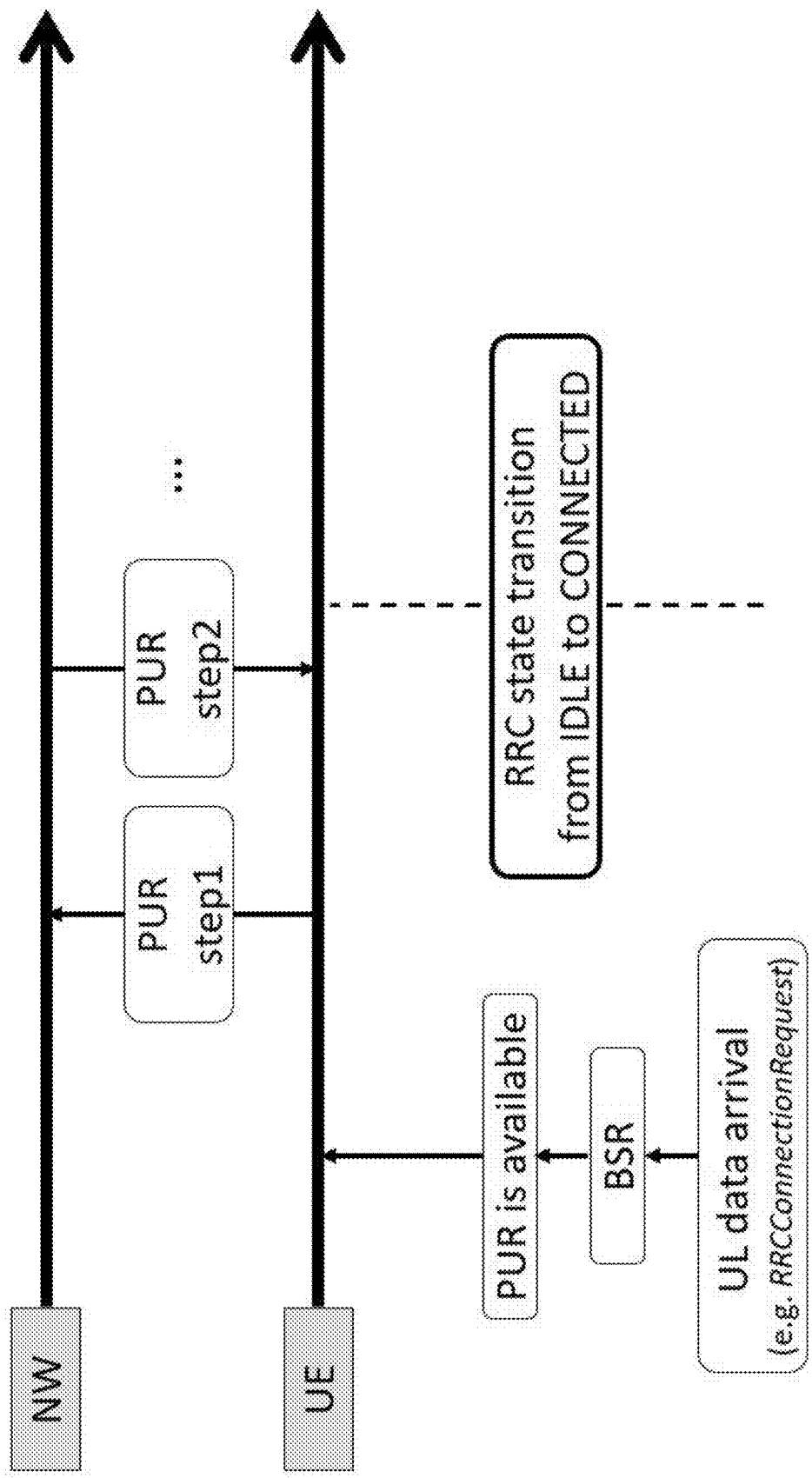
FIG. 9 is a diagram according to one exemplary embodiment.

FIG. 8 is an example of transmitting UL data through contention-based RA procedure in RRC_IDLE state, and FIG. 9 is an example of transmitting UL data through dedicated PUR in RRC_IDLE state. The signaling overhead and latency of transmission in dedicated PUR could be reduced as compared to contention-based RA procedure.

In legacy RRC connection establishment/resume procedure, because RA procedure is contention-based, contention resolution is necessary and UE-Identity information must be included in the RRC message and transmitted in Msg3. The UE-Identity information could be S-TMSI The UE-Identity information could be randomValue. The UE-Identity information could be ResumeIdentity (e.g. resumeID, truncatedResumeID, fullI-RNTI, or shortI-RNTI).

For transmission of RRC message using dedicated PUR, because NW can identify which UE is performing the transmission using PUR, contention resolution is not necessary and UE-Identity information in the RRC message results in redundant information and waste of UL resource. To solve such issue, the UE could determine whether to include UE-identity information (in the RRC message) based on whether PUR is used or not. There may be some alternatives:

1. (When the upper layers (e.g. NAS layer) request establishment or resumption of an RRC connection or when initiating a RRC connection establishment procedure or a RRC connection resume procedure,) the UE determines whether to include UE-Identity information in a RRC message based on whether the RRC message could be transmitted in (dedicated) PUR or not, e.g. whether (dedicated) PUR is available or not. For example, the UE does not include UE-Identity information in RRCEarlyDataRequest, RRCConnectionRequest, or RRCConnectionResumeRequest if the message is to be transmitted in dedicated PUR. If (dedicated) PUR is not available, the UE may or may not initiate EDT to transmit the RRC message with the UE-Identity information.
2. (When the upper layers (e.g. NAS layer) request establishment or resumption of an RRC connection or when initiating a RRC connection establishment procedure or a RRC connection resume procedure,) the UE determines whether to generate a first RRC message (with UE-Identity, e.g. RRCEarlyDataRequest, RRCConnectionRequest, or RRCConnectionResumeRequest) or a second RRC message (without UE-Identity, e.g. new RRC message) based on whether the (first or second) RRC message could be transmitted in (dedicated) PUR or not, e.g. whether (dedicated) PUR is available or not. For example, a new RRC message could be defined. The content of the new RRC message could be similar to legacy RRCEarlyDataRequest, RRCConnectionRequest, or RRCConnectionResumeRequest message, except that there is no UE-Identity information. UE RRC generates the new RRC message instead of RRCEarlyDataRequest, RRCConnectionRequest, or RRCConnectionResumeRequest message, if the message is to be transmitted in dedicated PUR. If (dedicated) PUR is not available, the UE may or may not initiate EDT to transmit the first RRC message (with the UE-Identity information).

For transmission of RRC message using PUR, because RRC message size is reduced (e.g. due to omission of UE-Identity information), the UE could choose a smaller Transport block (TB) size for transmission using PUR (in case multiple TB sizes are supported for PUR, similar to EDT), and results in less power consumption and/or more reliable transmission.

If transmission of RRC message using PUR fails (or is aborted) and fallback (e.g. to a random access procedure) is required, the UE could do one or multiple of following actions:

MAC layer could indicate the situation (e.g. transmission failure, transmission abortion, or fallback) to RRC layer.

MAC PDU for transmission using PUR could be discarded.

The UE could reset a MAC entity associated with the RRC message, e.g. MAC entity for SRB0.

The UE could re-establish a RLC entity associated with the RRC message, e.g. RLC entity for SRB0.

The UE could (re-)generate a RRC message which includes UE-Identity information and transmit the RRC message via a Random Access procedure.

For NB-IoT UEs, a DPR MAC CE is sent in Msg3 together with the CCCH SDU in order to provide buffer status information and power headroom information to the NW during RRC connection establishment or resume procedure. It may be beneficial that a UE includes a DPR MAC CE in the MAC PDU for transmission using PUR, e.g. if the MAC PDU contains a CCCH SDU for connection establishment or resume request (or if the MAC PDU is for transmission using PUR).

For EDT, it is stated in MAC spec (3GPP TS 36.321) that the MAC entity shall not generate a BSR MAC control element if new transmission is for Msg3, and the Data Volume in the DPR MAC CE (in case the DPR MAC CE is included in Msg3) is set to zero. For EDT using PUR, the same restriction(s) may also be applied:

If EDT is triggered/initiated and a BSR is triggered, the UE MAC shall not generate a BSR MAC control element if new transmission is for transmission using PUR (i.e. the EDT is performed using PUR); and/or If EDT is triggered/initiated and a DPR MAC CE is included in the MAC PDU for transmission using PUR (i.e. the EDT is performed using PUR), the Data Volume in the DPR MAC CE is set to zero.

Alternatively:

If EDT is triggered/initiated and a BSR is triggered, the UE MAC could generate a BSR MAC control element (to be included in a new transmission) if the new transmission is for transmission using PUR (i.e. the EDT is performed using PUR); and/or If EDT is triggered/initiated and a DPR MAC CE is included in the MAC PDU for transmission using PUR (i.e. the EDT is performed using PUR), the Data Volume in the DPR MAC CE could be set to non-zero (to reflect amount of data to be transmitted).

The above restriction(s) could be applied to transmission using dedicated PUR, or be applied to transmission using shared PUR, or be applied to both transmission using dedicated PUR and transmission using shared PUR.

To satisfy "PUR is available" (in current enhanced coverage level) for a UL transmission (e.g. including above mentioned RRC message), one or some of the following bullets need to be fulfilled:

1. The UE has valid TA (for PUR) (associated with current enhanced coverage level), e.g. at the time when the BSR/SR is triggered, in the following PUR occasion(s), when the upper layers (e.g. NAS layer) request establishment or resumption of an RRC connection, or etc.
2. The UE has valid PUR configuration (e.g. PUR has been configured) (associated with current enhanced coverage level), e.g. at the time when the BSR/SR is triggered, when the upper layers (e.g. NAS layer) request establishment or resumption of an RRC connection, or etc.
3. The message size of the UL transmission (e.g. UL data available for transmission plus MAC header and, where required, MAC control elements) is not larger than a predefined or configured threshold (associated with current enhanced coverage level).

4. The UL transmission is associated with a predefined or configured service. PUR may apply to some specific service(s) and not to other services.
5. The UL transmission is associated with a predefined or configured logical channel. PUR may apply to some specific logical channel(s) and not to other logical channels.
6. The distance (in time) between the time to check the availability of PUR (e.g. the BSR/SR triggering time, when the upper layers (e.g. NAS layer) request establishment or resumption of an RRC connection, or etc.) and the next PUR occasion (associated with current enhanced coverage level) is not larger than a predefined or configured threshold (associated with current enhanced coverage level).

Because PUR may be configured per enhanced coverage level, the above bullets may be for a specific enhanced coverage level, e.g. current enhanced coverage level at the time when a BSR/SR is triggered. The aforementioned configured threshold, service, logical channel could be configured per enhanced coverage level. The aforementioned configured threshold, service, logical channel could be configured per Serving Cell (i.e. shared among different enhanced coverage levels of the same Serving Cell). Availability of PUR in different enhanced coverage level may not need to be considered if current enhanced coverage level is not changed.

In the same enhanced coverage level, the message size threshold for PUR could be no larger than (e.g. smaller than or equal to) the message size threshold for EDT. In the same enhanced coverage level, the message size threshold for PUR could be no smaller than (e.g. larger than or equal to) the message size threshold for EDT. In the same enhanced coverage level, the message size threshold for PUR could be equal to the message size threshold for EDT. The message size threshold for EDT could be edt-TBS. The message size threshold for EDT could be broadcasted in system information.

PUR mentioned above could be dedicated PUR. PUR mentioned above could be PUR to be used when the UE is not in RRC_CONNECTED, e.g. RRC_IDLE or RRC_INACTIVE.

Figure 10:
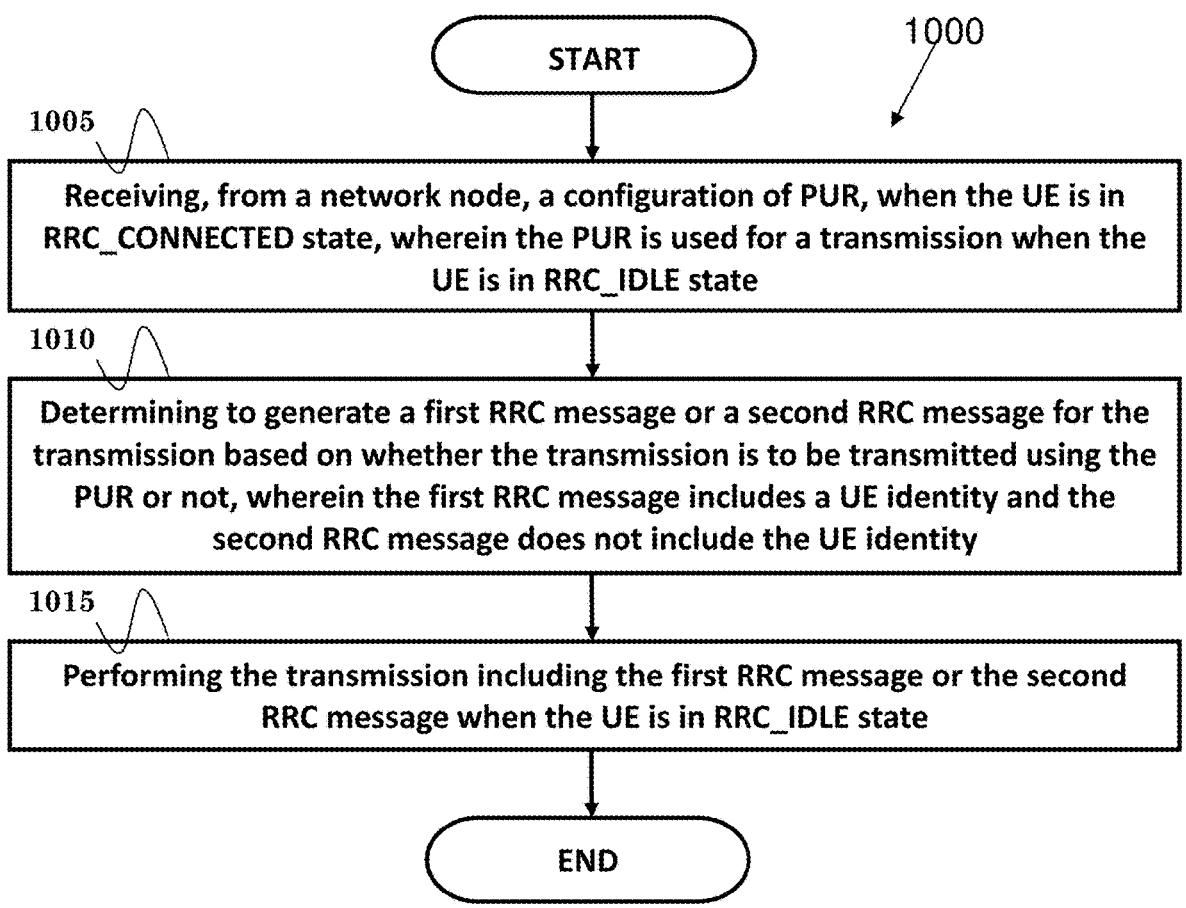
FIG. 10 is a flow chart according to one exemplary embodiment.

FIG. 10 is a flow chart 1000 according to one exemplary embodiment from the perspective of a UE. In step 1005, the UE receives, from a network node, a configuration of PUR, when the UE is in RRC_CONNECTED state, wherein the PUR is used for a transmission when the UE is in RRC_IDLE state. In step 1010, the UE determines to generate a first RRC message or a second RRC message for the transmission based on whether the transmission is to be transmitted using the PUR or not, wherein the first RRC message includes a UE identity and the second RRC message does not include the UE identity. In step 1015, the UE performs the transmission including the first RRC message or the second RRC message when the UE is in RRC_IDLE state.

In one embodiment, the UE could determine to generate the first RRC message or the second RRC message for the transmission based on whether the PUR is available or not. The UE could generate the first RRC message if the transmission is not to be transmitted using the PUR. The UE could generate the second RRC message if the transmission is to be transmitted using the PUR.

In one embodiment, the UE could receive, from the network node, a downlink message in response to the transmission, wherein the UE enters RRC_CONNECTED state in response to receiving the downlink message. The UE could set a Cell Radio Network Temporary Identifier (C-RNTI) to a value of a first RNTI in the configuration. Alternatively or additionally, the UE could determine whether to set a Cell Radio Network Temporary Identifier (C-RNTI) to a value of a first RNTI in the configuration based on whether the downlink message includes a second RNTI or not.

In one embodiment, the UE could generate the first RRC message or the second RRC message when the UE wants to establish a RRC connection or when the UE initiates a RRC connection establishment procedure. Alternatively, the UE could generate the first RRC message or the second RRC message when the UE wants to resume a RRC connection or when the UE initiates a RRC connection resume procedure. The first RRC message could be a RRCEarlyDataRequest, RRCConnectionRequest, or RRCConnectionResumeRequest message.

Referring back to FIGS. 3 and 4, in one exemplary embodiment of a UE, the device 300 includes a program code 312 stored in the memory 310. The CPU 308 could execute program code 312 to enable the UE (i) to receive, from a network node, a configuration of PUR, when the UE is in RRC_CONNECTED state, wherein the PUR is used for a transmission when the UE is in RRC_IDLE state, (ii) to determine to generate a first RRC message or a second RRC message for the transmission based on whether the transmission is to be transmitted using the PUR or not, wherein the first RRC message includes a UE identity and the second RRC message does not include the UE identity, and (iii) to perform the transmission including the first RRC message or the second RRC message when the UE is in RRC_IDLE state. Furthermore, the CPU 308 can execute the program code 312 to perform all of the above-described actions and steps or others described herein.

Figure 11:
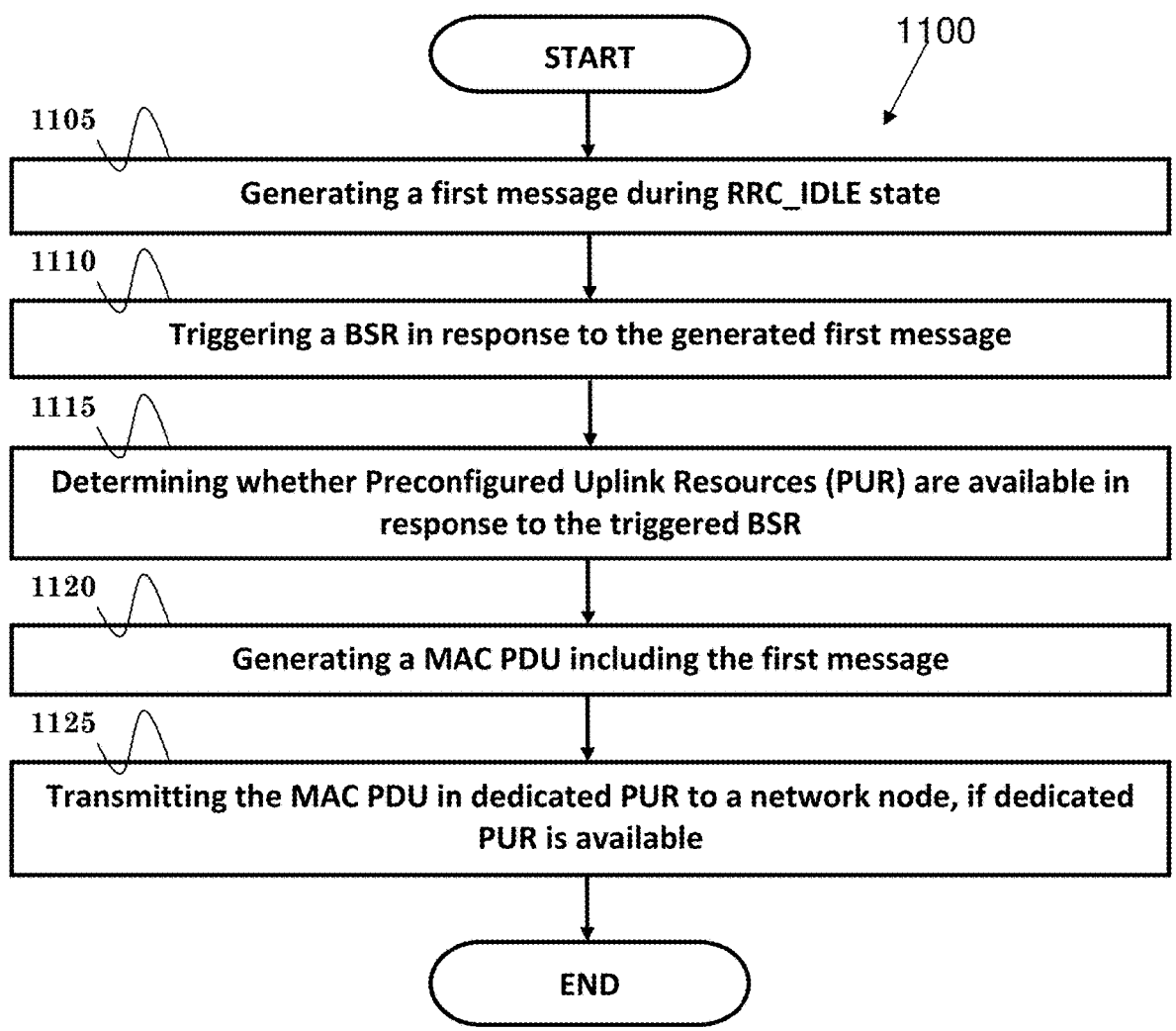
FIG. 11 is a flow chart according to one exemplary embodiment.

FIG. 11 is a flow chart 1100 according to one exemplary embodiment from the perspective of a UE. In step 1105, the UE generates a first message during RRC_IDLE state. In step 1110, the UE triggers a Buffer Status Report (BSR) in response to the generated first message. In step 1115, the UE determines whether dedicated Preconfigured Uplink Resources (PUR) are available in response to the triggered BSR. In step 1120, the UE generates a Medium Access Control (MAC) Protocol Data Unit (PDU) including the first message. In step 1125, the UE transmits the MAC PDU in dedicated PUR to a network node, if dedicated PUR is available.

In one embodiment, the UE may include a BSR MAC control element in the MAC PDU when generating the MAC PDU. The UE may include a DPR MAC control element in the MAC PDU when generating the MAC PDU. The UE may not trigger a Scheduling Request (SR) or a Random Access (RA) procedure, if dedicated PUR is available.

In one embodiment, the UE could cancel the triggered BSR in response to transmitting the MAC PDU. The UE could receive a second message from the network node after transmitting the MAC PDU. The UE could cancel the triggered BSR in response to receiving the second message, if the second message indicates that the MAC PDU is transmitted successfully.

In one embodiment, the UE could enter RRC_CONNECTED state in response to receiving the second message, if the second message includes RRCConnectionSetup or RRCConnectionResume. The UE could also enter RRC_CONNECTED state in response to receiving the second message, if the second message indicates that UE should enter RRC_CONNECTED state. However, the UE may not enter RRC_CONNECTED state in response to receiving the second message, if the second message indicates that UE should not enter RRC_CONNECTED state.

In one embodiment, the UE may not include UE-Identity information in the first message when generating the first message, if dedicated PUR is available for transmitting the first message. However, the UE may include UE-Identity information in the first message when generating the first message, if dedicated PUR is not available for transmitting the first message.

In one embodiment, the UE could generate a third message instead of the first message, if dedicated PUR is not available for transmitting the first message, wherein the third message includes UE-Identity information and the first message does not include UE-Identity information. Furthermore, when or after entering RRC_CONNECTED state, the UE could set a C-RNTI to the value of a specific RNTI, wherein the second message is scheduled by a DL assignment addressed to the specific RNTI.

In one embodiment, the UE may not include a BSR MAC control element in the MAC PDU when generating the MAC PDU, if an Early Data Transmission (EDT) is triggered or initiated. The UE could set the Data Volume field in the Data-Pull-Request (DPR) MAC Control Element (CE) to zero when generating the MAC PDU, if an Early Data Transmission (EDT) is triggered or initiated.

In one embodiment, the first message could be RRCEarlyDataRequest, RRCConnectionRequest, RRCConnectionResumeRequest, or RRCEarlyDataComplete message. The second message may include RRCConnectionSetup or RRCConnectionResume message. The specific RNTI could be C-RNTI or Temporary C-RNTI. The specific RNTI could be a RNTI for PUR. Furthermore, the specific RNTI could be provided in a PUR configuration. The UE-Identity could be S-TMSI, randomValue, or ResumeIdentity (e.g. resumeID, truncatedResumeID, fullI-RNTI, or shortI-RNTI).

Referring back to FIGS. 3 and 4, in one exemplary embodiment of a UE, the device 300 includes a program code 312 stored in the memory 310. The CPU 308 could execute program code 312 to enable the UE (i) to generate a first message during RRC_IDLE state, (ii) to trigger a BSR in response to the generated first message, (iii) to determine whether Preconfigured Uplink Resources (PUR) are available in response to the triggered BSR, (iv) to generate a MAC PDU including the first message, and (v) to transmit the MAC PDU in dedicated PUR to a network node, if dedicated PUR is available. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), comprising:
    receiving, from a network node, a configuration of Preconfigured Uplink Resources (PUR) including a first Radio Network Temporary Identifier (RNTI) when the UE is in RRC_CONNECTED state;
    determining to use the PUR for transmitting a first Radio Resource Control (RRC) message, or to initiate a Random Access (RA) procedure for transmitting the first RRC message based on whether the PUR is available or not;
    transmitting, using the PUR, the first RRC message when the UE is in RRC_IDLE or RRC_INACTIVE state;
    receiving, from the network node, a second RRC message in response to transmission of the first RRC message; and
    entering RRC_CONNECTED state and setting a Cell Radio Network Temporary Identifier (C-RNTI) to a value of the first RNTI, in response to reception of the second RRC message,
    wherein the UE determines whether the PUR is available or not at least based on if Time Alignment (TA) is valid, and wherein whether the TA is valid or not is at least based on Serving Cell Reference Signal Received Power (RSRP) changes.

2. The method of claim 1, further comprising:
    determining whether to set the C-RNTI to the value of the first RNTI based on whether the second RRC message includes a second RNTI or not.

3. The method of claim 2, wherein the UE sets the C-RNTI to a value of the second RNTI if the second RRC message includes the second RNTI, and the UE sets the C-RNTI to the value of the first RNTI if the second RRC message does not include the second RNTI.

4. The method of claim 1, wherein the C-RNTI is used for monitoring Physical Downlink Control Channel (PDCCH) in RRC_CONNECTED state.

5. The method of claim 1, wherein the first RNTI is used for monitoring Physical Downlink Control Channel (PDCCH) in RRC_IDLE or RRC_INACTIVE state.

6. The method of claim 1, wherein the second RRC message is scheduled by a downlink assignment addressed to the first RNTI.

7. The method of claim 1, wherein the first RRC message is for a RRC connection establishment procedure or a RRC connection resume procedure and the UE enters RRC_CONNECTED state via the RRC connection establishment procedure or the RRC connection resume procedure without performing the RA procedure.

8. The method of claim 1, wherein the first RRC message is a RRCEarlyDataRequest, RRCConnectionRequest, or RRCConnectionResumeRequest message.

9. The method of claim 1, wherein the second RRC message is a RRCConnectionSetup, or RRCConnectionResume message.

10. A User Equipment (UE), comprising:
    a control circuit;
    a processor installed in the control circuit; and
    a memory installed in the control circuit and operatively coupled to the processor;
    wherein the processor is configured to execute a program code stored in the memory to:
        receive, from a network node, a configuration of Preconfigured Uplink Resources (PUR) including a first Radio Network Temporary Identifier (RNTI) when the UE is in RRC_CONNECTED state;
        determine to use the PUR for transmitting a first Radio Resource Control (RRC) message, or to initiate a Random Access (RA) procedure for transmitting the first RRC message based on whether the PUR is available or not;
        transmit, using the PUR, the first RRC message when the UE is in RRC_IDLE or RRC_INACTIVE state;
        receive, from the network node, a second RRC message in response to transmission of the first RRC message; and
        enter RRC_CONNECTED state and set a Cell Radio Network Temporary Identifier (C-RNTI) to a value of the first RNTI, in response to reception of the second RRC message,
        wherein the UE determines whether the PUR is available or not at least based on if Time Alignment (TA) is valid, and wherein whether the TA is valid or not is at least based on Serving Cell Reference Signal Received Power (RSRP) changes.

11. The UE of claim 10, wherein the processor is further configured to execute a program code stored in the memory to:
    determine whether to set the C-RNTI to the value of the first RNTI based on whether the second RRC message includes a second RNTI or not.

12. The UE of claim 11, wherein the UE sets the C-RNTI to a value of the second RNTI if the second RRC message includes the second RNTI, and the UE sets the C-RNTI to the value of the first RNTI if the second RRC message does not include the second RNTI.

13. The UE of claim 10, wherein the C-RNTI is used for monitoring Physical Downlink Control Channel (PDCCH) in RRC_CONNECTED state.

14. The UE of claim 10, wherein the first RNTI is used for monitoring Physical Downlink Control Channel (PDCCH) in RRC_IDLE or RRC_INACTIVE state.

15. The UE of claim 10, wherein the second RRC message is scheduled by a downlink assignment addressed to the first RNTI.

16. The UE of claim 10, wherein the first RRC message is for a RRC connection establishment procedure or a RRC connection resume procedure and the UE enters RRC_CONNECTED state via the RRC connection establishment procedure or the RRC connection resume procedure without performing the RA procedure.

17. The UE of claim 10, wherein the first RRC message is a RRCEarlyDataRequest, RRCConnectionRequest, or RRCConnectionResumeRequest message.

18. The UE of claim 10, wherein the second RRC message is a RRCConnectionSetup, or RRCConnectionResume message.

* * * * *